United States Patent
Takenouchi et al.

(10) Patent No.: US 8,981,014 B2
(45) Date of Patent: Mar. 17, 2015

(54) PHOSPHORUS-CONTAINING PHENOLIC RESIN, METHOD FOR MANUFACTURING THE SAME, AND USE OF THE SAME

(71) Applicants: Meiwa Plastic Industries, Ltd., Yamaguchi (JP); UFC Corporation, Taipei (TW)

(72) Inventors: Masato Takenouchi, Yamaguchi (JP); Tadatoshi Fujinaga, Yamaguchi (JP); Erina Kimura, Yamaguchi (JP); Yu-Chin Lee, Taipei (TW); Jen-Hai Liao, Taipei (TW); Sung-Chen Lo, Taipei (TW)

(73) Assignees: Meiwa Plastic Industries, Ltd., Yamaguchi (TW); UFC Corporation, Taipei (TW)

( * ) Notice: Subject to any disclaimer, the term of this patent is extended or adjusted under 35 U.S.C. 154(b) by 0 days.

(21) Appl. No.: 14/279,673

(22) Filed: May 16, 2014

(65) Prior Publication Data

US 2014/0378622 A1    Dec. 25, 2014

(30) Foreign Application Priority Data

May 17, 2013 (TW) .............................. 102117693 A

(51) Int. Cl.
| | |
|---|---|
| *C08G 65/32* | (2006.01) |
| *C08G 61/10* | (2006.01) |
| *C08L 63/00* | (2006.01) |
| *C08L 65/00* | (2006.01) |
| *C08L 71/02* | (2006.01) |

(52) U.S. Cl.
CPC ................. *C08G 61/10* (2013.01); *C08L 63/00* (2013.01); *C08L 65/00* (2013.01); *C08L 2203/20* (2013.01)
USPC ............................ 525/409; 525/480; 525/534

(58) Field of Classification Search
USPC .......................................... 525/409, 480, 534
See application file for complete search history.

(56) References Cited

FOREIGN PATENT DOCUMENTS

JP        2001220427 A     8/2001

OTHER PUBLICATIONS

English abstract of JP 2001-220427A.

*Primary Examiner* — Terressa Boykin
(74) *Attorney, Agent, or Firm* — McCarter & English, LLP; Yu Lu

(57) ABSTRACT

The present invention provides a novel phosphorus-containing phenolic resin. When the phosphorus-containing phenolic resin is used as an epoxy resin curing agent, the cured product thereof has various excellent properties such as excellent moisture resistance, low permittivity, a low dissipation factor, and excellent adhesion in addition to improved flame retardation. Specifically, the phosphorus-containing phenolic resin of the invention is represented by formula (1). The invention also provides a method for manufacturing the novel phosphorus-containing phenolic resin, a phenolic resin composition including the phosphorus-containing phenolic resin, an epoxy resin curing agent including the phenolic resin composition, an epoxy resin composition including the epoxy resin curing agent and an epoxy resin, a cured product obtained by curing the epoxy resin composition, and a copper-clad laminated plate obtained by using the epoxy resin composition as a matrix resin.

21 Claims, 12 Drawing Sheets

PHOSPHORUS-CONTAINING PHENOLIC RESIN, METHOD FOR MANUFACTURING THE SAME, AND USE OF THE SAME

REFERENCE TO RELATED APPLICATION

This application claims foreign priority under 35 U.S.C. §119(a) to Patent Application No. 102117693, filed on May 17, 2013, in the Intellectual Property Office of Ministry of Economic Affairs, Republic of China (Taiwan, R.O.C.), the entire content of which patent application is incorporated herein by reference.

BACKGROUND OF THE INVENTION

1. Field of the Invention

The present invention relates to a novel phosphorus-containing phenolic resin and a method for manufacturing the same. More specifically, the present invention relates to a phenolic resin composition including a novel phosphorus-containing phenolic resin, an epoxy resin curing agent including the phenolic resin composition, an epoxy resin composition including the epoxy resin curing agent and an epoxy resin, a cured product obtained by curing the epoxy resin composition, and a copper-clad laminated plate obtained by using the epoxy resin composition as a matrix resin.

2. Background

Phenolic resins are suitable for use as curing agents for epoxy resins. An epoxy resin composition using a phenolic resin as a curing agent has various advantages such as high heat tolerance and moisture resistance, such that the composition is widely used in the field of semiconductors or electronic elements as a material for a printed wiring board, an interlayer insulating material for a buildup substrate, a semiconductor encapsulating material, a material for a conductive binder, etc.

In recent years, in a step for mounting a printed wiring board, the conventionally used lead solder has been switched to lead-free solder after taking account of environmental protection. The melting temperature of the lead-free solder is higher than that of the lead solder by about 20 to 40° C. Therefore, the temperature used in the mounting step must be increased. Moreover, the heat tolerance of the material for the printed wiring board, or the encapsulating material needs to be further increased. Especially, the moisture resistance of these materials is required to be improved when the goal is to prevent cracks from forming during moisture absorption and reflow soldering. Furthermore, as the amount of information transmitted is augmented and communication becomes high speed, signals need to be made into short wavelengths (i.e., high frequency) in order to be transmitted at a large quantity per unit of time. To achieve the above, low permittivity and a low dissipation factor are required.

Furthermore, flame retardation is typically required for electronic elements such as printed wiring boards. When an epoxy resin composition is being used as a material for a printed wiring board, a halogen-based flame retardant, such as a bromine-based flame retardant, is often combined and blended with an antimony compound to impart flame retardation. However, for the environmental/safety strategies in recent years, there is a strong demand to develop a flame retardation method which does not use a combination of a halogen-based flame retardant and an antimony compound and conform to the environmental/safety strategy.

To meet the demand, flame retardation by using phosphorus-containing compounds has been discussed. For example, the methods of adding phosphorus-based flame retardants, such as phosphate-based compounds like triphenyl phosphate (TPP), tricresyl phosphate (TCP) or cresyl diphenyl phosphate (CDP) in epoxy resin compositions have been discussed.

For example, patent document 1 (JP 2001-220427) proposes a flame-retardant epoxy resin curing agent containing an active hydrogen atom, which introduces a group containing a phosphorus atom into a specific phenolic compound.

Although the flame retardant epoxy resin curing agent having an active hydrogen atom, as proposed in patent document 1, can improve flame retardation and inhibit the generation of harmful substances during burning, it cannot satisfy the requirements of various properties such as moisture resistance, permittivity and the dissipation factor.

SUMMARY OF THE INVENTION

The present invention provides a novel phosphorus-containing phenolic resin and a method for manufacturing the novel phosphorus-containing phenolic resin. When the novel phosphorus-containing phenolic resin is being used as an epoxy resin curing agent, the cured product thereof has various properties such as excellent moisture tolerance, low permittivity, a low dissipation factor, and excellent adhesion, in addition to improved flame retardation. Moreover, the present invention also provides a phenolic resin composition including the novel phosphorus-containing phenolic resin, an epoxy resin curing agent including the phenolic resin composition, an epoxy resin composition including the epoxy resin curing agent and an epoxy resin, a cured product obtained by curing the epoxy resin composition, and a copper-clad laminated plate using the epoxy resin composition as a matrix resin.

The present invention is discussed in more detail below.

Invention 1 relates to a phosphorus-containing phenolic resin represented by formula (1):

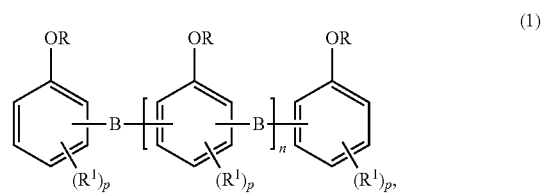

wherein each R is independently a hydrogen atom or a phosphorus-containing group represented by formula (2), and at least one R is a phosphorus-containing group represented by formula (2),

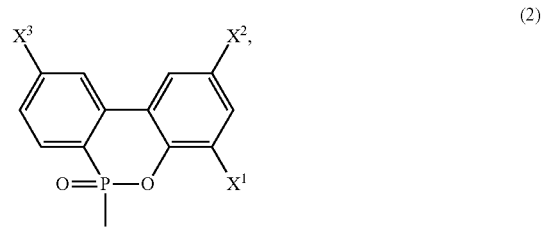

wherein $X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group, and a sulfonate group, and preferably $X^1$, $X^2$ and $X^3$ are hydrogen atoms, each $R^1$ is independently an alkyl group having a carbon number of from 1 to 10, each p is independently an integer of from 0 to 3, and preferably is 0, each B is independently a divalent group represented by formula (3-1) or (3-2):

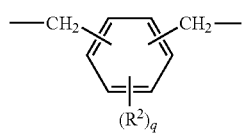

(3-1)

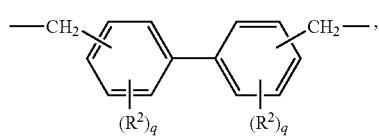

(3-2)

wherein each $R^2$ is independently an alkyl group having a carbon number of from 1 to 10, each q is independently an integer of from 0 to 4, and preferably is 0, n is an average and is a number of from 0 to 100.

Invention 2 relates to a phosphorus-containing phenolic resin of invention 1, wherein the phosphorus content of the phosphorus-containing phenolic resin is from 0.1 to 9 mass %.

Invention 3 relates to a phosphorus-containing phenolic resin, which is obtained by reacting a phenolic resin represented by formula (1') and a phosphorus compound represented by formula (2'):

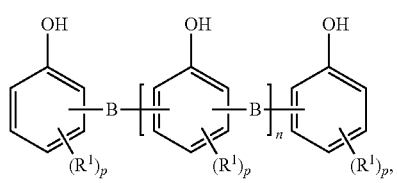

(1')

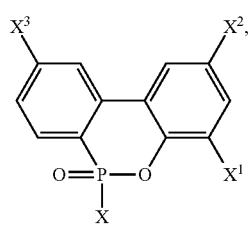

(2')

wherein X is a halogen atom, and $X^1$, $X^2$ and $X^3$ have the same definitions as those described in invention 1.

Invention 4 relates to a phosphorus-containing phenolic resin of invention 3, wherein the phosphorus compound represented by formula (2') is provided in the reaction in an amount of from 0.01 to 1.5 mole, relative to 1 mole of a phenolic hydroxyl group in formula (1').

Invention 5 relates to a phenolic resin composition, which includes a phosphorus-containing phenolic resin of any one of inventions 1 to 4.

Invention 6 relates to the phenolic resin composition of invention 5, wherein the phosphorus content of the phenolic resin composition is from 0.1 to 9 mass %.

Invention 7 relates to an epoxy resin curing agent, which includes phenolic resin composition of inventions 5 or 6.

Invention 8 relates to an epoxy resin composition, which includes the epoxy resin curing agent of invention 7 and an epoxy resin.

Invention 9 relates to a cured product, which is formed by curing the epoxy resin composition of invention 8.

Invention 10 relates to a copper-clad laminated plate, which uses the epoxy resin composition of invention 8 as a matrix resin.

Invention 11 relates to a method for manufacturing a phosphorus-containing phenolic resin, which includes a step of reacting a phenolic resin represented by formula (1') and a phosphorus-containing compound represented by formula (2');

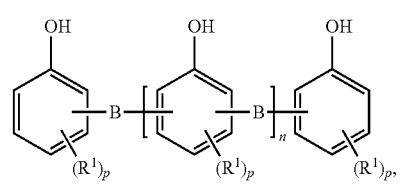

(1')

wherein $R^1$, p, B and n have the same definitions as those described in invention 1;

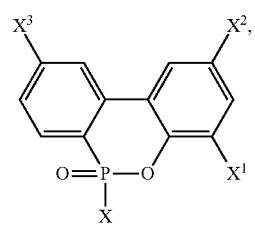

(2')

wherein X is a halogen atom, and $X^1$, $X^2$ and $X^3$ have the same definitions as those described in invention 1.

Invention 12 relates to a method for manufacturing the phosphorus-containing phenolic resin of invention 11, which further includes a step of obtaining a compound represented by formula (7) by oxidizing a compound represented by formula (6); and a step of obtaining a phosphorus compound represented by formula (2') by halogenating the compound represented by formula (7);

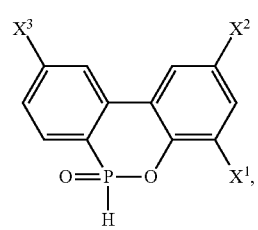

(6)

wherein $X^1$, $X^2$ and $X^3$ have the same definitions as those described in invention 1;

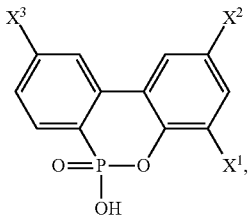

(7)

wherein $X^1$, $X^2$ and $X^3$ have the same definitions as those described in invention 1.

According to the present invention, a novel phosphorus-containing phenolic resin and a method for manufacturing the novel phosphorus-containing phenolic resin are provided. When the phosphorus-containing phenolic resin is used as an epoxy resin curing agent, the cured product thereof has various properties such as excellent moisture tolerance, low permittivity, a low dissipation factor and excellent adhesion, in addition to having improved flame retardation.

In addition, a phenolic resin composition including the novel phosphorus-containing phenolic resin, an epoxy resin curing agent including the phenolic resin composition, an epoxy resin composition including the epoxy resin curing agent and an epoxy resin, a cured product obtained by curing the epoxy resin composition, and a copper-clad laminated plate obtained by using the epoxy resin composition as a matrix resin.

DETAILED DESCRIPTION OF THE INVENTION

Figure 1:
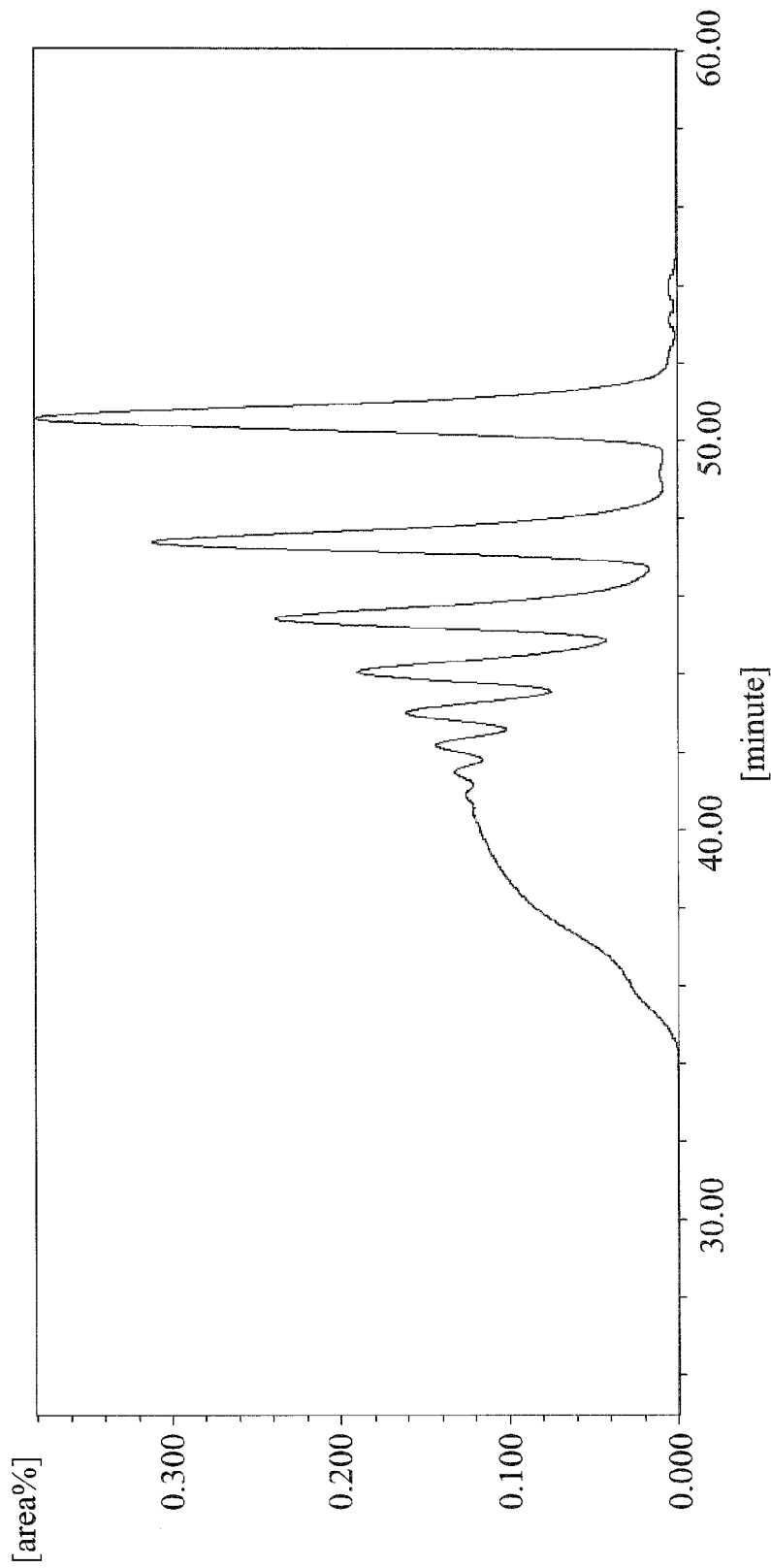
FIG. 1 is a GPC graph of phenolic resin A as a raw material of Example 1.

The detailed description of the invention is illustrated by the specific embodiments below, so as to allow a person skilled in the art to easily appreciate the other advantages and effects of the disclosure of the present specification.

Phosphorus-Containing Phenolic Resin

The present invention relates a novel phosphorus-containing phenolic resin having an intramolecular phosphorus atom, as represented by formula (1) above.

In formula (1), each R is independently a hydrogen atom or a phosphorus-containing group represented by formula (2) above, and at least one R is a phosphorus-containing group represented by formula (2). A ratio of the mole number of the phosphorus-containing group represented by formula (2) to the mole number of all of the Rs in the resin represented by formula (1) (hereinafter referred to "hydroxyl group modification ratio ($\alpha$)") is calculated below.

Hydroxyl group modification ratio ($\alpha$)=mole number of the phosphorus-containing group represented by formula (2)/mole number of all of the Rs The hydroxyl group modification ratio ($\alpha$) may be from 0.1 to 100 mole %, and preferably from 5 to 80 mole %. From the aspects of heat tolerance and flame retardation, the hydroxyl group modification ratio is preferably from 5 to 40 mole %, and more preferably from 10 to 30 mole %.

In formula (1), each B is independently a divalent group represented by formula (3-1) or (3-2) above. B may all be represented by formula (3-1), formula (3-2) or both. From the aspect of adhesion, preferably 30 mole % or more, more preferably 50 mole %, even more preferably 70 mole % or more, and particularly preferably 100 mole % of B are divalent groups represented by formula (3-2). 100 mole % of B that are divalent groups represented by formulae (3-1) are also suitable for use.

In formula (1), n is an average and is a number of from 0 to 100. From the operation aspect, n is preferably a number of from 0 to 60, more preferably from 0 to 30, and particularly preferably from 0 to 10.

In formula (1), each $R^1$ is independently an alkyl group having a carbon number of from 1 to 10. The alkyl group may be linear or branched. $R^1$ is preferably an alkyl group having a carbon number of from 1 to 6, and more preferably is methyl or ethyl.

In formula (1), each p is independently an integer of from 0 to 3, and preferably an integer of from 0 to 2, more preferably an integer of from 0 to 1, and particularly preferably an integer of 0. The benzene ring has no substituent when p is 0, but the structure is economically beneficial.

In formula (3-1) or (3-2), each $R^2$ is independently an alkyl group having a carbon number of from 1 to 10. The alkyl group may be linear or branched. $R^2$ is preferably an alkyl group having a carbon number of from 1 to 6, and more preferably is methyl or ethyl.

In formula (3-1) or (3-2), each q is independently an integer of from 0 to 3, preferably an integer of from 0 to 2, preferably an integer of from 0 to 1, and particularly preferred an integer of 0. The benzene ring has no substituent when q is 0, but the structure is economically beneficial.

Formula (3-1) is preferably a divalent group represented by formula (3-1a) below, and formula (3-2) is preferably a divalent group represented by formula (3-2a) below.

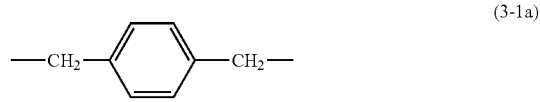

(3-1a)

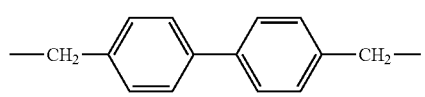
(3-2a)

The phosphorus-containing phenolic resin represented by formula (1) may be exemplified by the one represented by formula (1-1a) or formula (1-2a) below. Formula (1-1a) shows that 100 mole % of B are the divalent groups represented by formula (3-1a) and p and q are 0, and formula (1-2a) shows that 100 mole % of B are the divalent groups represented by formula (3-2a) and p and q are 0.

more preferably a methoxy group or an ethoxy group. The sulfo group is —$SO_3H$, and the sulfonate group is —$SO_3R^a$, wherein $R^a$ may be exemplified by an alkyl group having a carbon number of from 1 to 6, which may be linear or branched, and preferably is a methyl or ethyl group.

$X^1$, $X^2$ and $X^3$ are each preferably a hydrogen atom, a methyl group, a phenyl group or a benzyl group, and more preferably $X^1$, $X^2$ and $X^3$ are all hydrogen atoms.

The phosphorus-containing phenolic resin of the present invention has a number average molecular weight (Mn) of preferably from 300 to 8000, more preferably from 500 to 4000, and particularly preferably from 1000 to 2000, but it is not limited thereto. In the present specification, the number

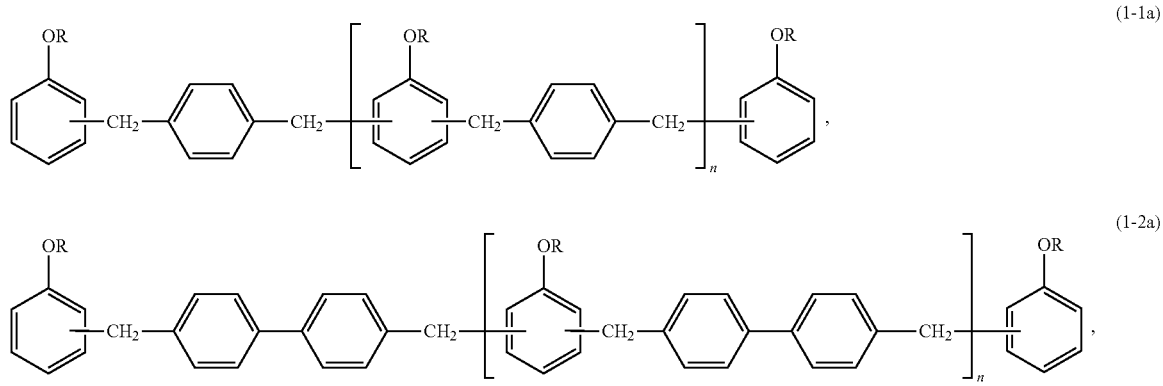

wherein the exemplifications and preferred examples of R and n in formula (1) are suitable as R and n in the above formulae.

In formula (2), $X^1$, $X^2$ and $X^3$ are each independently a hydrogen atom, a halogen atom, an alkyl group having a carbon number of from 1 to 8, a cycloalkyl having a carbon number of from 3 to 10, an allyl group, an aryl group, an aralkyl group, a hydroxyl group, an alkoxy group having a carbon number of from 1 to 8, a cyano group, a sulfo group or a sulfonate group.

Regarding $X^1$, $X^2$ and $X^3$, the halogen atom may be exemplified by a chlorine atom, a bromine atom or a iodine atom, and preferably a chlorine atom; the alkyl group having a carbon number of from 1 to 8 may be linear or branched, and preferably is an alkyl group having a carbon number of from 1 to 6, and more preferably methyl or ethyl; the cycloalkyl group having a carbon number of from 3 to 10 is preferably a cycloalkyl group having a carbon number of from 3 to 8, and preferably a cyclohexyl group; the aryl group may be exemplified by an aryl group having a carbon number of from 6 to 20, and preferably is an aryl group having a carbon number of from 6 to 12, and more preferably a phenyl group or a tolyl group; the aralkyl group may be exemplified by an aralkyl group having a carbon number of from 7 to 21, and preferably is an aralkyl group having a carbon number of from 7 to 13, and more preferably a benzyl group or a phenethyl group; for the alkoxy group having a carbon number of from 1 to 8, the alkyl moiety may be linear or branched, and preferably is an alkoxy group having a carbon number of from 1 to 6, and average molecular weight is a value obtained by using gel permeation chromatograph and polystyrene as a calibration line.

Moreover, the phosphorus-containing phenolic resin of the present invention has a softening point of preferably from 30 to 200° C., more preferably from 40 to 150° C., and particularly preferably from 40 to 120° C., but it is not limited thereto.

From the aspect of the use of an epoxy resin curing agent, the phosphorus-containing phenolic resin of the present invention has a phosphorus content (i.e., the mass % of the phosphorus atom in 100 mass % of phosphorus-containing phenolic resin) of preferably from 0.1 to 9 mass %, more preferably from 0.1 to 7 mass %, even more preferably from 0.5 to 5 mass %, and particularly preferably from 1 to 4 mass %.

The present invention further relates to a phosphorus-containing phenolic resin obtained by reacting a phenolic resin represented by formula (1') above and a phosphorus compound represented by formula (2') above.

In formula (1'), $R^1$, p, B and n have the same definitions as $R^1$, p, B and n in formula (1), and those exemplifications and the preferred examples in formula (1) are suitable for use as $R^1$, p, B and n in formula (1').

The phenolic resin represented by formula (1') may be exemplified by the one represented by formula (1'-1a) or formula (1'-2a) below. Formula (1'-1a) shows that 100 mole % of B are the divalent groups represented by formula (3-1a) and p and q are 0, and formula (1'-2a) shows that 100 mole % of B are the divalent groups represented by formula (3-2a) and p and q are 0.

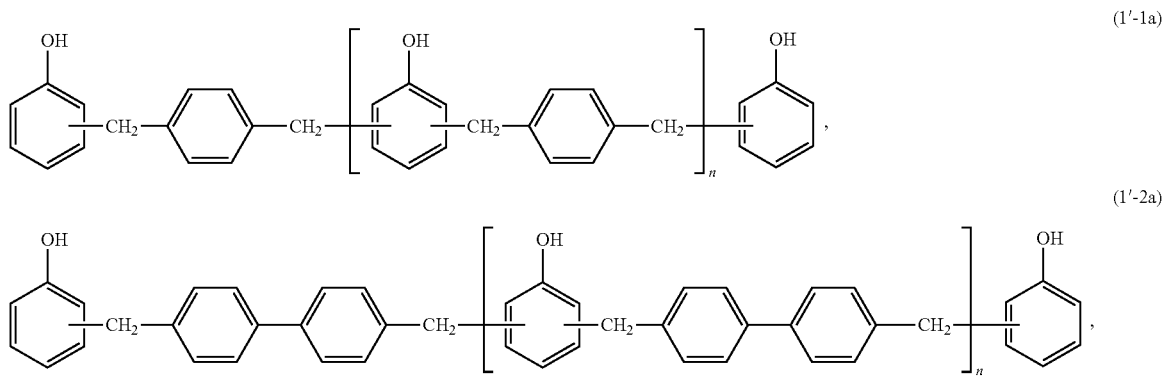

wherein the exemplifications and preferred examples of n in formula (1) are suitable as n in the above formulae.

In formula (2'), X is a halogen atom such as a chlorine atom, a bromine atom or an iodine atom; and $X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group or a sulfonate group. The exemplifications and preferred examples of $X^1$, $X^2$ and $X^3$ in formula (2') are those of $X^1$, $X^2$ and $X^3$ in formula (2). From the aspect of the reactivity with the phenolic hydroxyl group, 10-chloro-9,10-dihydro-9-oxa-10-phosphaphenanthrene-10-oxide (or 6H-dibenz[c,e][1,2]oxaphosphorin, 6-chloro, 6-oxide) (hereinafter referred to as DOPO-C) is preferred, wherein X is a chlorine atom, and $X^1$, $X^2$ and $X^3$ are hydrogen atoms.

In the reaction, the phenolic hydroxyl group of the phenolic resin represented by formula (1') reacts with the halogen atom of the phosphorus compound represented by formula (2') and allows hydrogen halide leave, so as to introduce the above phosphorus compound into a phenolic hydroxyl group.

Relative to 1 mole of the phenolic hydroxyl group of formula (1'), the amount of the phosphorus compound represented by formula (2') may be an amount of from 0.01 to 1.5 mole. From the aspects of heat tolerance and flame retardation, the amount is preferably from 0.07 to 0.7 mole %, and more preferably from 0.1 to 0.4 mole %. The hydroxyl group modification ratio (α) in the obtained phosphorus-containing phenolic resin may be easily adjusted by altering the amount of the phosphorus compound represented by formula (2'). The reaction of the phenolic resin represented by formula (1') and the phosphorus compound represented by formula (2') may be carried out in an organic solvent inert to the reaction and under reflux. The hydrogen chloride gas produced in the reaction is removed, and the solvent is distilled off from the reaction mixture, and thereby obtaining the phosphorus-containing phenolic resin. The organic solvent may be exemplified by, for example, xylene, toluene, etc., and it is preferably exemplified by anhydrous organic solvents. The reaction time is not particularly limited, but it may be about 12 to 24 hours. The hydrogen chloride gas produced may be collected by feeding diluted limewater.

Regarding the compound represented by formula (2'), the compound represented by formula (6) above is oxidized to obtain the compound represented by formula (7) above, and then the compound represented by formula (7) is halogenated to obtain the compound represented by formula (2').

That is, the method for manufacturing the phosphorus-containing phenolic resin of the present invention preferably includes steps 1 to 3 below.

Step 1: a step of oxidizing a compound represented by formula (6) to obtain a compound represented by formula (7);

Step 2: a step of halogenating the compound represented by formula (7) obtained in step 1 to obtain a phosphorus-containing compound represented by formula (2'); and Step 3: a step of reacting a phenolic resin represented by formula (1') and the phosphorus-containing compound represented by formula (2') obtained in step 2.

In step 1, the compound represented by formula (6) is oxidized to obtain the compound represented by formula (7). The oxidation may be carried out by using an excess aqueous hydrogen peroxide solution as an oxidant, and heating the compound represented by formula (6) in a molten state at a temperature of from 90 to 100° C.

In step 2, the compound represented by formula (7), as obtained in step 1, is halogenated to obtain a phosphorus-containing compound represented by formula (2'). The halogenation is carried out by heating the compound represented by formula (7) and thionyl chloride at a reaction temperature of from 70 to 80° C. under reflux.

In step 3, the phenolic resin represented by formula (1') is reacted with the phosphorus-containing compound represented by formula (2') obtained in step 2, and the phosphorus compound is introduced into a phenolic hydroxyl group of the phenolic resin to obtain the phosphorus-containing phenolic resin. The reaction of the phenolic resin represented by formula (1') and the phosphorus-containing compound represented by formula (2') may be carried out in an organic solvent inert to the reaction under reflux. The hydrogen chloride gas produced in the reaction is removed, and the organic solvent is distilled off from the reaction mixture, and thereby obtaining the phosphorus-containing phenolic resin. The organic solvent may be exemplified, for example, as xylene, toluene, etc., and preferably anhydrous solvents. The reaction time is not particularly limited, but it may be about 12 to 24 hours. The hydrogen chloride gas produced may be collected by feeding diluted limewater.

In formulae (6) and (7), $X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group or a sulfonate group. The exemplifications and preferred examples of $X^1$, $X^2$ and $X^3$ in formulae (6) and (7) are those of $X^1$, $X^2$ and $X^3$ in formula (2).

9,10-dihydro-9-oxa-10-phosphaphenanthrene-10-oxide is preferably used as a compound represented by formula (6), wherein $X^1$, $X^2$ and $X^3$ are hydrogen atoms (hereinafter referred to as DOPO) to obtain a compound represented by formula (7), which is 9,10-dihydro-10-hydroxy-9-oxa-10-phosphaphenanthrene-10-oxide, wherein $X^1$, $X^2$ and $X^3$ are hydrogen atoms (hereinafter referred to as DOPO-OH).

Phenolic Resin Composition

The phosphorus-containing phenolic resin of the present invention may be optionally combined with other phenolic resins to form a phenolic resin composition. The phenolic resin composition may be a phosphorus-containing phenolic resin represented by formula (1) itself, or may be a combination with other phenolic resins. Further, the phenolic resin composition may be a reaction product of the compounds represented by formulae (1') and (2'), and may also be a combination with other phenolic resins.

Other phenolic resins may be exemplified by a phenol formaldehyde resin, a cresol formaldehyde resin, a phenol aralkyl resin, a triphenylmethane type phenolic resin, a naphthol formaldehyde resin, etc. The phenolic resin represented by formula (1') may also be suitably used. In the epoxy resin composition, the phosphorus-containing phenolic resin of the present invention is preferably 30 mass % or more, more preferably 50 mass % or more, even more preferably 70 mass % or more, particularly 90 mass % or more or may also be 100 mass %.

The phenolic resin composition may be suitably used as an epoxy resin curing agent. At the same time, the phosphorus content (i.e., the mass % of phosphorus atom in 100 mass % of phenolic resin composition) is preferably 0.1 mass % or above. If the phosphorus content is 0.1 mass % or more, an epoxy resin composition having excellent flame retardation, moisture tolerance, dielectric properties (i.e., low permittivity and a low dissipation factor), and adhesion is readily obtained. Further, the phosphorus content is preferably 9 mass % or less. If the phosphorus content is 9 mass % or less, an epoxy resin composition having good heat tolerance, curability and mechanical properties is obtained. The epoxy resin can have a broad range of applications. The phosphorus content is more preferably from 0.1 to 7 mass %, even more preferably from 0.5 to 5 mass %, and particularly preferably from 1 to 4 mass %.

The phosphorus content of the phenolic resin composition may be easily adjusted by altering the hydroxyl group modification ratio ($\alpha$) of the phosphorus-containing phenolic resin of the present invention. Alternatively, the phosphorus content of the phenolic resin composition may be easily adjusted by blending a phosphorus-free phenolic resin in the phosphorus-containing phenolic resin. The phosphorus-free phenolic resins are not particularly limited, but may be exemplified by a phenol formaldehyde resin, a cresol formaldehyde resin, a phenol aralkyl resin, a triphenylmethane type phenolic resin, a naphthol formaldehyde resin, etc.

Epoxy Resin Composition

The epoxy resin composition of the present invention may include an epoxy resin curing agent containing an epoxy resin and a phenolic resin composition of the present invention.

The epoxy resins is not particularly limited, and may be exemplified by a bisphenol F type epoxy resin, a cresol novolac type epoxy resin, a phenol novolac type epoxy resin, a triphenylmethane type phenolic resin, a biphenyl type epoxy resin, an glycidyl ether type epoxy resin, an glycidyl ester type epoxy resin, an glycidyl amine type epoxy resin, etc.

The blending proportion of the epoxy resin curing agent including an epoxy resin and a phenol resin composition can be suitably selected. Relative to one mole of the epoxy group of the epoxy resin, the mole number of the phenolic hydroxyl group of the phenolic resin composition of the present invention is preferably from 0.2 to 1.2, and more preferably from 0.3 to 1.0, but it is not limited thereto.

Under the situation that the effects of the present invention are not adversely affected, the epoxy resin composition of the present invention may include a common additive, such as a curing agent other than a phenolic curing agent, a curing promoter, a filler, a flame retardant, a coupling agent or a colorant.

The curing agent other than a phenolic curing agent may be exemplified by a common curing agent, such as an acid anhydride or an amine compound.

The curing promoter may be exemplified by an organic phosphorus compound and a borate salt thereof, a tertiary amine salt, a quaternary ammonium salt, imidazole and a tetraphenyl borate salt thereof.

The filler may be a suitable organic filler or an inorganic filler, and are preferably an inorganic filler, such as amorphous silicon dioxide, crystalline silicon dioxide, alumina, or glass.

Since the phosphorus-containing phenolic resin of the present invention has the effect of a flame retardant, a flame retardant might not be necessary. However, phosphoric acid, aluminum hydroxide, etc. may be further used in combination with the phosphorus-containing phenolic resin of the present invention.

The condition for curing the epoxy resin composition of the present invention may be appropriately selected. For example, a cured product may be obtained by conducting a heat treatment at, for example, 50 to 300° C., and preferably from 130 to 250° C., for 0.01 to 20 hours, and preferably for 0.1 to 10 hours.

The cured product of the epoxy resin composition of the present invention may have excellent moisture tolerance and various excellent properties such as low dielectric, a dissipation factor and adhesion, in addition to improved flame retardation. Hence, the cured product may be used as a material for a printed wiring board, an interlayer insulating material for a buildup substrate, a semiconductor encapsulating material, a conductive binder material, etc., such that it is suitable for use in the field of semiconductors or electronic elements.

A copper-clad laminated plate of the present invention is characterized in that the epoxy resin composition of the present invention is used as a matrix resin. More specifically, a substrate is immersed in the epoxy resin composition of the present invention to obtain a pre-immersion body, the pre-immersion body is laminated with copper foil, and the copper-clad laminated plate of the present invention is obtained by curing the laminate and integrally forming.

The substrate to be used as a pre-immersion body is a conventional substrate, for example, paper, glass fabric, glass pad, aramid fiber, carbon fiber, etc.

The condition for desiccating the substrate immersed by the epoxy resin composition of the present invention is appropriately selected. For example, the substrate may be heated at a temperature ranging from 80 to 200° C. in a desiccating furnace.

The thus-obtained pre-immersion bodies and the copper foil overlap to form a predetermined number of sheets, and the sheets are laminated. The laminated sheets are then heat pressed by a presser that is heated to a temperature of from about 50 to 250° C., so as to cure the copper foil and a plurality of pieces of the pre-immersion body and make them integrally form a piece.

Moreover, when a substrate such as glass fabric is immersed in the epoxy resin composition, the epoxy resin composition may be uniformly dissolved in a solvent and then varnished for use in appropriate immersion. The solvent at the moment may be exemplified by methyl ethyl ketone, N,N-dimethylformamide, acetone, methyl isobutyl ketone, etc.

EXAMPLES

The present invention is more specifically illustrated by the following examples. However, the present invention is not limited to the examples.

The methods for determining the properties in the examples are illustrated as follows.

A Method for Determining the Phosphorus Content of a Phenolic Resin Composition

In the present invention, the content of the phosphorus atom (mass %) of the phenolic resin composition was determined as follows. That is, 0.2±0.01 g of the phenolic resin was added to 6 mL of concentrated nitric acid to obtain a mixture. The mixture was subjected to a pretreatment by using a sample pretreatment system, Multiwave 3000, manufactured by PerkinElmer Inc. The mixture was diluted with 250 mL of deionized water. The phosphorus content was determined by using an inductively coupled plasma atomic emission spectrometer (IPC-AES), Optima 7000DV, manufactured by PerkinElmer Inc.

Moreover, in the present invention, when the phenolic resin composition was the phosphorus-containing phenolic resin itself, the phosphorus content was obtained by directly determining the phosphorus-containing phenolic resin. When the phenolic resin composition was a combination of the phosphorus-containing phenolic resin and other phosphorus-free phenolic resins, the phosphorus content of the phosphorus-containing phenolic resin used was directly determined, and the value was used along with the mass percentages of other phosphorus-free phenolic resins to calculate the phosphorus content of the phenolic resin composition.

A Method for Determining the Hydroxyl Equivalent of a Phenolic Resin

The phenolic resin was acetylated by acetyl chloride, excess acetyl chloride was degraded by water, and the hydroxyl equivalent of the phenolic resin was determined by using a method for base titration. The specific steps are described as follows.

1 g of a test material was dissolved in 10 mL of 1,4-dioxane to obtain a solution. At 0° C., a solution of 1.5 mol/L of acetyl chloride in 10 mL of anhydrous toluene was added to the above solution. 2 mL of pyrimidine was added thereto. A reaction took place in a thermostatic water tank at 60±1° C. for 1 hour. After the reaction, the solution was cooled, 25 mL of pure water was added, and mixing took place to allow for sufficient degradation of acetyl chloride. Then, 25 mL of acetone and phenolphthalein were added to the solution, and 1 mol/L of an aqueous potassium hydroxide solution was used for titration until the solution of the test material turned reddish purple. The hydroxyl equivalent of the blank (i.e., the test material free) was also determined by repeating the aforesaid steps.

The hydroxyl equivalent was calculated by the following equation.

Hydroxyl equivalent [g/eq]=(1000×$W$)/($f$×($b-a$)), herein W, f, b and a are respectively discussed below.
W: the weight of a test material (g)
f: the factor of 1 mol/L of an aqueous potassium hydroxide solution
b: the amount of 1 mol/L of an aqueous potassium hydroxide solution [mL] required for determining the blank
a: the amount of 1 mol/L of an aqueous potassium hydroxide solution [mL] required for determining the test material.

A Method for Determining a Softening Point

The softening point measuring device, FP83HT, manufactured by Mettler Toledo Co., Inc. was used for the determination at a temperature ramp rate of 2° C./minute.

A Method for Determining a Number Average Molecular Weight (Mn)

Gel permeation chromatograph, HLC-8220GPC, manufactured by Tosho Co., Ltd. was used for a GPC determination at the following conditions, and a calibration line of standard polystyrene was used to calculate Mn.

| Columns: | |
| --- | --- |
| TSK-GEL | H type |
| G2000HxL | x 4 columns |
| G3000HxL | x 1 column |
| G4000HxL | x 1 column |

Determination Conditions:
Temperature: 40° C.
Solvent: THF
Feeding pressure: 14.2 MPa
Flowing rate: 1 mL/minute
Detector: RI8022

A Method for Calculating the Hydroxyl Group Modification Ratio ($\alpha$) of a Phosphorus-Containing Phenolic Resin The hydroxyl group modification ratio ($\alpha$) of the phosphorus-containing phenolic resin was calculated by using an equation based on the phosphorus content (mass %) of the phosphorus-containing phenolic resin, the number average molecular weight (Mn), and the number of a full R in formula (1) (N=n of formula (1)+2), as shown below.

(hydroxyl group modification ratio)=[(phosphorus content)×(number average molecular weight)]/[31×$NJ$]

A Method for Determining an P-NMR Spectrum

In the present invention, P-NMR was determined by the following method. That is, a test material was dissolved by using DMSO-d6 with the same mass, and then a superconducting nuclear magnetic resonance system, Mercury 400 MHz NMR, manufactured by Varian Inc. was used for determination.

A Method for Determining an IR Spectrum

In the present invention, an IR spectrum was determined by the following method. That is, a test material was first made into powder, a Fourier transform infrared spectrometer FT-IR analyzer, FT-IR, was used, and ZeSe crystals were determined according to the ATR method.

The followings illustrate the phenolic resins used in the examples.
(1) Phenolic resin A: a xylylene type phenolic resin represented by formula (1'-1a), which is a phenolic resin having an hydroxyl equivalent of 178 g/eq, a softening point of 80° C., and Mn of 1010.
(2) Phenolic resin B: a biphenyl type phenolic resin represented by formula (1'-2a), which is a phenolic resin having a hydroxyl equivalent of 232 g/eq, a softening point of 86° C., and Mn of 1050.
(3) Phenolic resin C: a phenol formaldehyde resin including phenol and formaldehyde, which is a phenolic resin having a hydroxyl equivalent of 104 g/eq, a softening point of 87° C., and Mn of 670.

Synthesis Example 1

Synthesis of DOPO-C 500 g of 9,10-dihydro-9-oxa-10-phosphaphenanthrene-10-oxide (DOPO) and 635 g of water were mixed in a three-necked round-bottom flask. The mixture was maintained at 90° C. for 30 minutes, and 254 g of 30 mass % of an aqueous hydrogen peroxide solution was added and then maintained at 90° C. for 2 hours to complete the reaction and generate 10-hydroxy-9,10-dihydro-9-oxa-10-phosphaphenanthrene-10-oxide (DOPO-OH). DOPO-OH was collected by filtering the reaction mixture under outgassing, and rinsed with water for purification to obtain purified DOPO-OH. The obtained purified DOPO-OH was white powder. Yield: 92%. Purity: 99.5%.

In a three-necked round-bottom flask equipped with a condenser, 840 g of the DOPO-OH obtained in the aforesaid steps was mixed with 1400 g of thionyl chloride. The mixture was maintained at a temperature of from 70 to 80° C., and heated under reflux for 18 hours to allow a reaction of thionyl chloride and DOPO-OH to complete and generate DOPO-C. Unreacted thionyl chloride was distilled off, and the yellow crude DOPO-C was separated and recovered. The crude DOPO-C was distilled under a reduced pressure for purification, so as to obtain purified DOPO-C. The obtained purified DOPO-C was a grayish white solid. Yield: 92%. Purity: 99.3%.

Example 1

Synthesis of a Phosphorus-Containing Xylylene Type Phenolic Resin

In a three-necked round-bottom flask equipped with a condenser, a solution made by dissolving 90.2 g of DOPO-C in 200 g of anhydrous xylene as a solvent was added to a mixture of 131.0 g of phenolic resin A and 250 g of the anhydrous xylene solvent over 30 minutes. The obtained mixture was heated at a temperature of from 140 to 150° C. for 24 hours under reflux until hydrogen chloride stopped bubbling. The hydrogen chloride gas produced was collected by feeding dilute limewater. Then, the xylene solvent was distilled off under a reduced pressure, and the residual reaction mixture was diluted with 400 g of 1,2-dichloroethane. The diluted reaction mixture cooled to about 80° C., and then it was sufficiently rinsed with 200 g of water, 200 g of a 5% aqueous sodium carbonate solution and 200 g of water. The oil phase was separated. The solvent was distilled off and the oil phase was desiccated, so as to obtain a phosphorus-containing phenolic resin as a viscous liquid. If the viscous liquid cools, it would solidify.

The obtained phosphorus-containing phenolic resin had a phosphorus content of 4.7%, a softening point of 120° C., a hydroxyl equivalent of 439 g/eq, Mn of 1160, and a hydroxyl group modification ratio of 31%.

Figure 2:
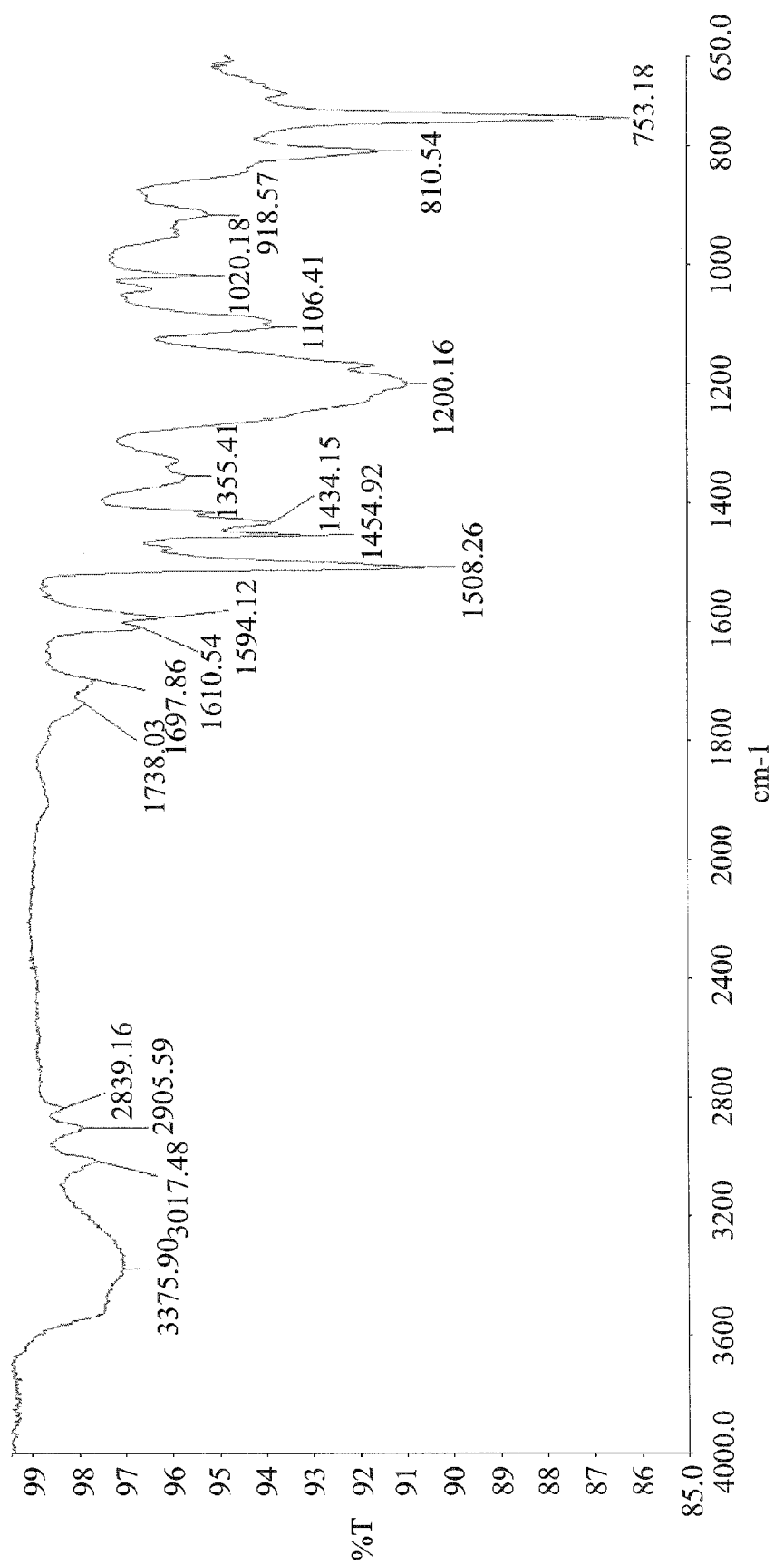
FIG. 2 is an IR graph of phenolic resin A as a raw material of Example 1.
Figure 3:
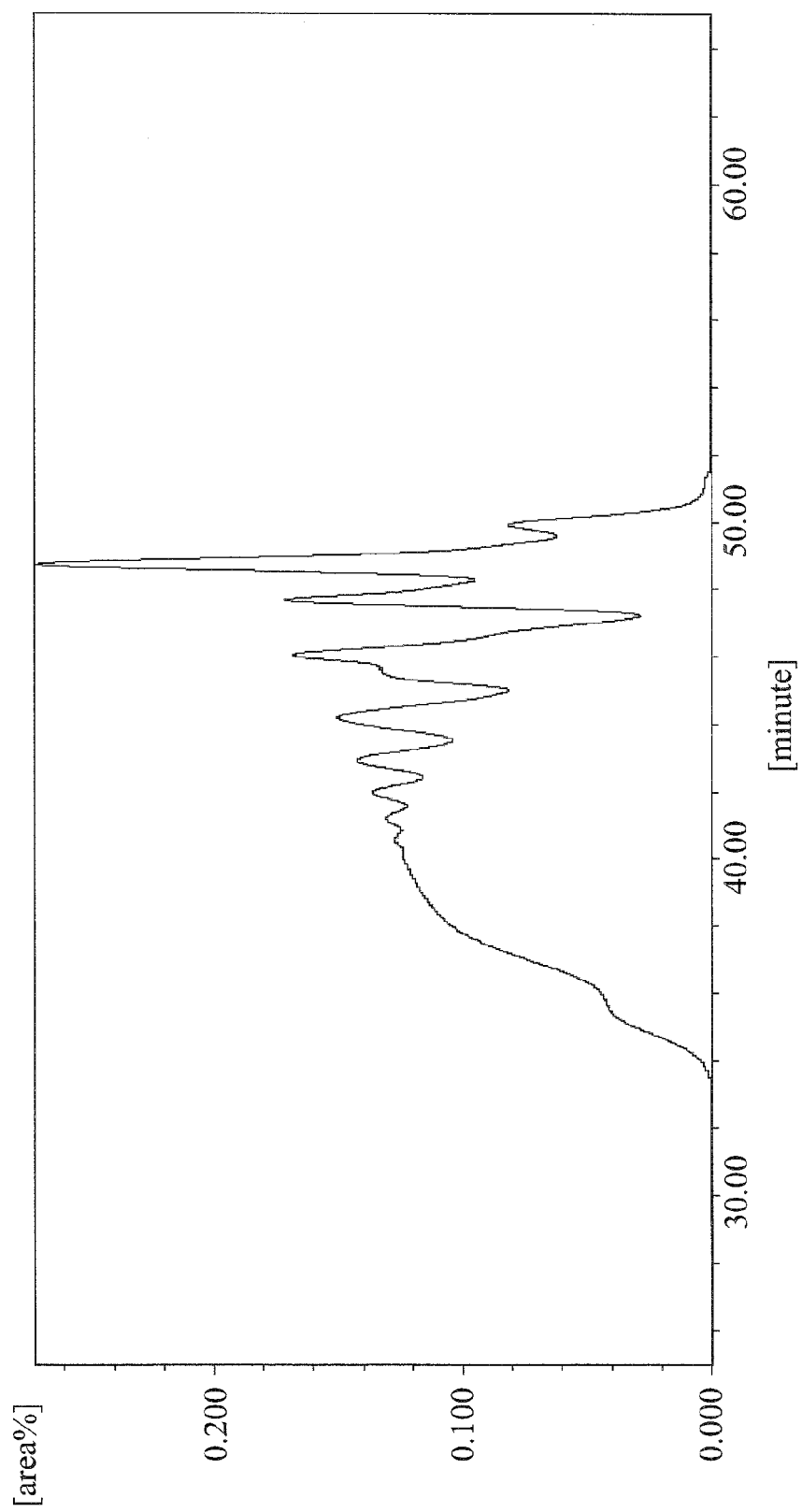
FIG. 3 is a GPC graph of a phosphorus-containing phenolic resin of Example 1.
Figure 4:
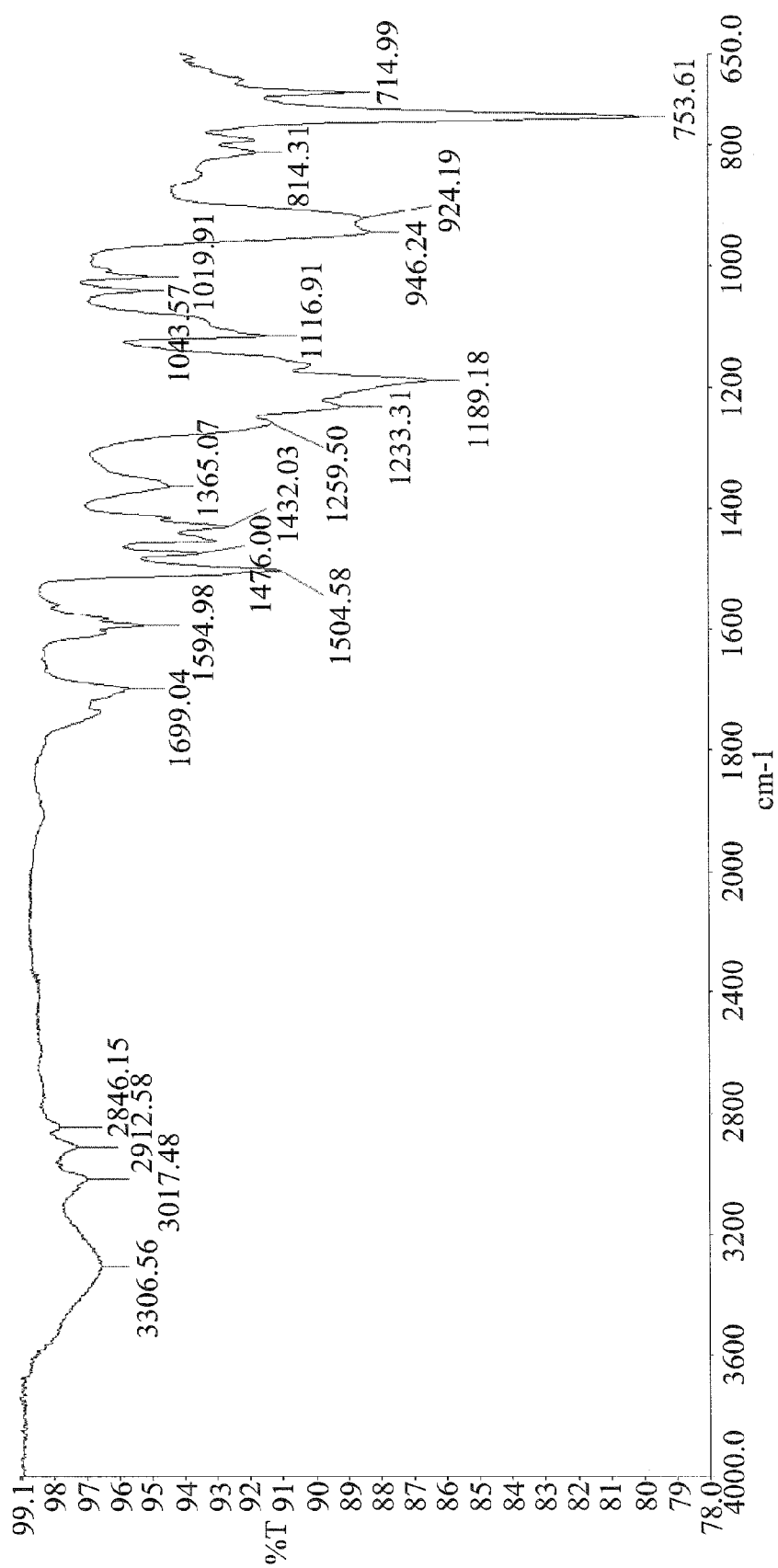
FIG. 4 is an IR graph of the phosphorus-containing phenolic resin of Example 1.

The GPC graph of phenolic resin A as a raw material is shown in FIG. 1, and the IR graph is shown in FIG. 2. Moreover, the GPC graph of the obtained phosphorus-containing phenolic resin is shown in FIG. 3, and the IR graph is shown in FIG. 4. As seen from the IR graph of the obtained phosphorus-containing phenolic resin, the intensity of the wavelength peak of the hydroxyl group (328 $cm^{-1}$) was lowered, and the wavelength peak intensity of the phosphorus atom-oxygen atom-phenyl group (950 $cm^{-1}$) was elevated. Hence, the performance of the reaction was confirmed.

Example 2

Synthesis of a Phosphorus-Containing Xylylene Type Phenolic Resin

In a three-necked round-bottom flask equipped with a condenser, a solution made by dissolving 45.1 g of DOPO-C in 100 g of anhydrous xylene as a solvent was added to a mixture of 131.0 g of phenolic resin A and 250 g of the anhydrous xylene solvent over 30 minutes. The obtained mixture was heated at a temperature of from 140 to 150° C. for 24 hours under reflux until hydrogen chloride stopped bubbling. The hydrogen chloride gas produced was collected by feeding dilute limewater. Then, the xylene solvent was distilled off under a reduced pressure, and the residual reaction mixture was diluted with 250 g of 1,2-dichloroethane. The diluted reaction mixture cooled to about 80° C., and then it was sufficiently rinsed with 100 g of water, 100 g of a 5% aqueous sodium carbonate solution and 100 g of water. The oil phase was separated. The solvent was distilled off and the oil phase was desiccated, so as to obtain a phosphorus-containing phenolic resin as a viscous liquid. If the viscous liquid cooled, it would solidify.

The phosphorus-containing phenolic resin obtained had a phosphorus content of 2.9%, a softening of 99° C., a hydroxyl equivalent of 285 g/eq, Mn of 1130, and a hydroxyl group modification ratio of 19%.

Figure 5:
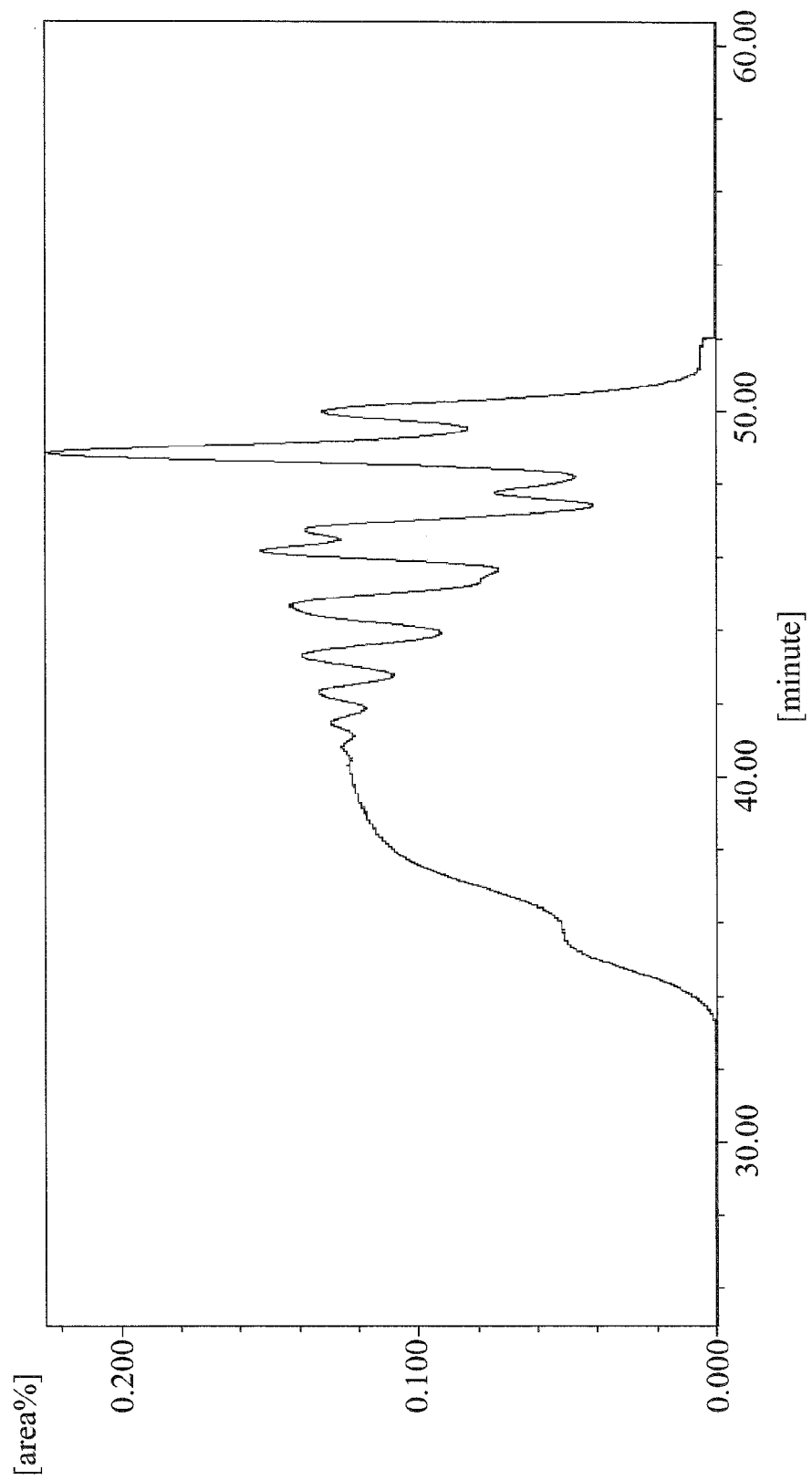
FIG. 5 is a GPC graph of a phosphorus-containing phenolic resin of Example 2.
Figure 6:
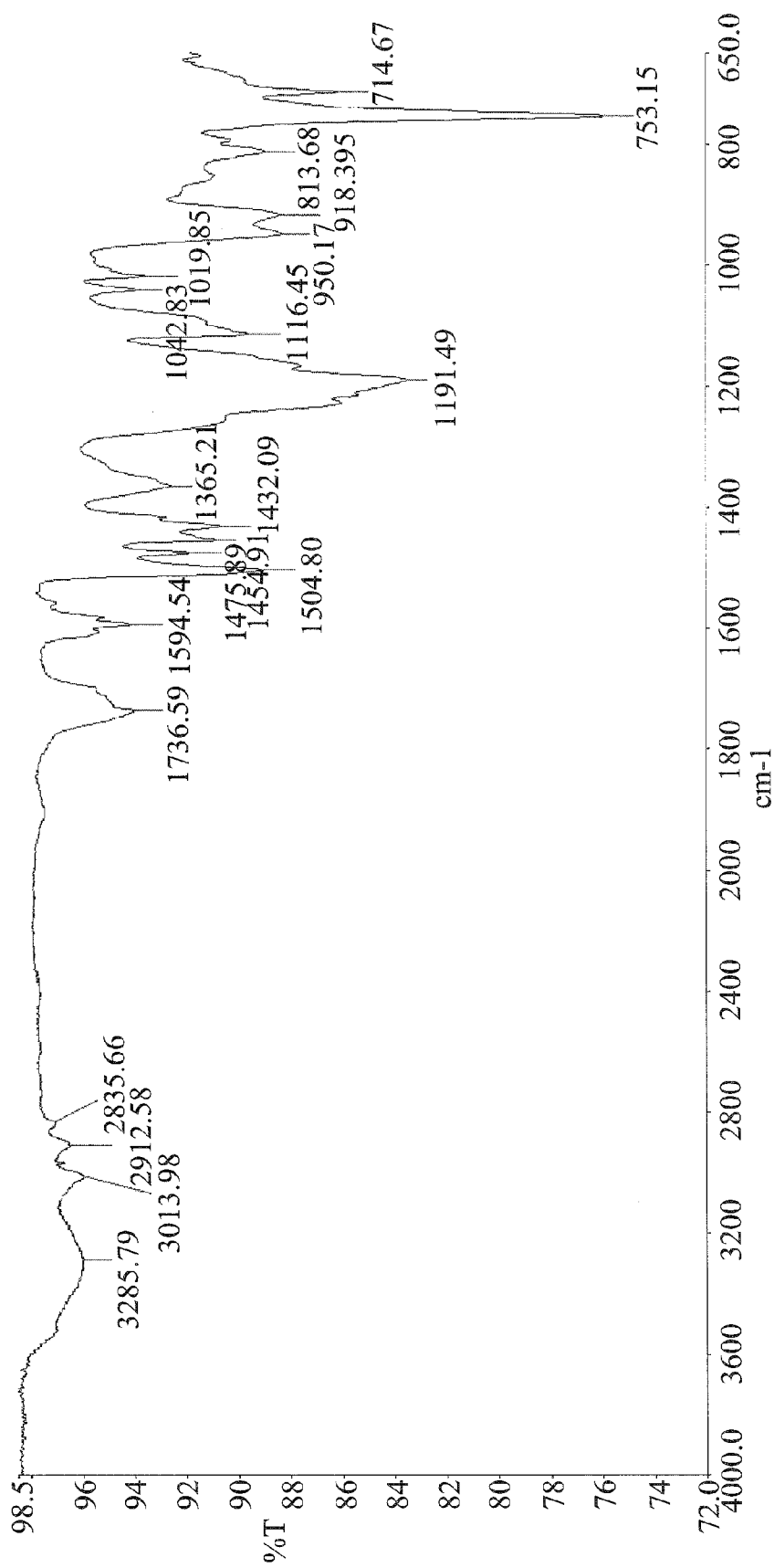
FIG. 6 is an IR graph of the phosphorus-containing phenolic resin of Example 2.
Figure 7:
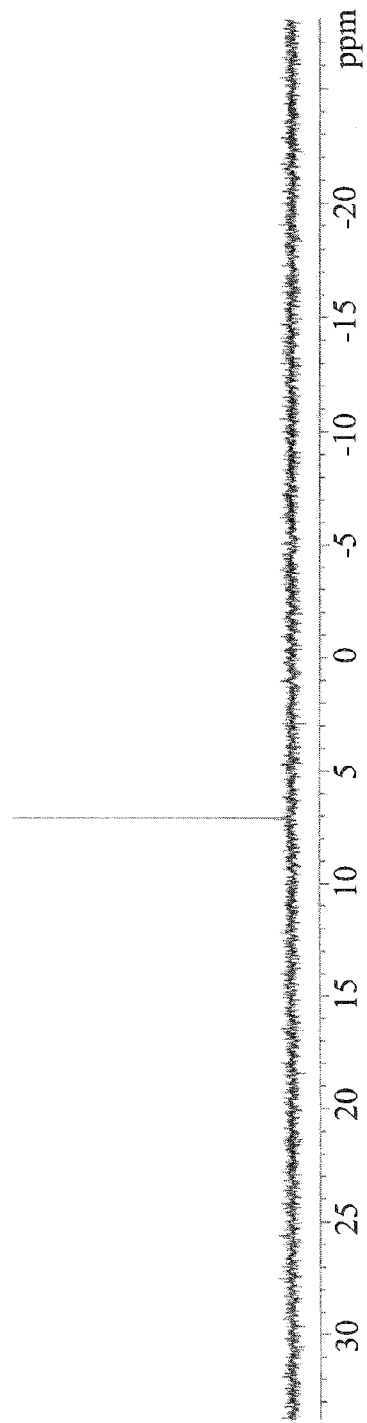
FIG. 7 is an P-NRM spectrum of 10-chloro-9,10-dihydro-9-oxa-10-phosphaphenanthrene-10-oxide (DOPO-C).
Figure 8:
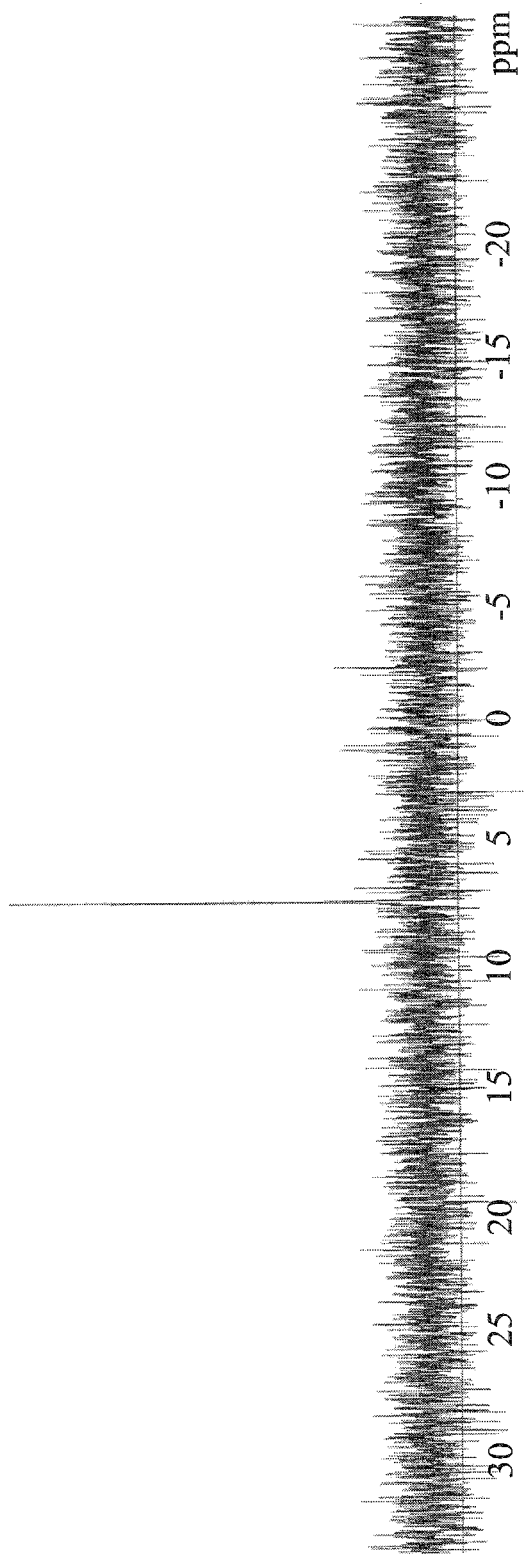
FIG. 8 is an P-NMR graph of the phosphorus-containing phenolic resin of Example 2.

The GPC graph of the obtained phosphorus-containing phenolic resin is shown in FIG. 5, and the IR graph is shown in FIG. 6. Moreover, the P-NMR spectrum of the DOPOC raw material is shown in FIG. 7, and the P-NMR spectrum of the obtained phosphorus-containing phenolic resin is shown in FIG. 8. The wavelength peak of phosphorus was shifted from 7.062 ppm to 7.379 ppm. P-NMR also confirmed the performance of the reaction.

Example 3

Synthesis of a Phosphorus-Containing Biphenyl Type Phenolic Resin

In a three-necked round-bottom flask equipped with a condenser, a solution made by dissolving 45.1 g of DOPO-C in 100 g of anhydrous xylene as a solvent was added to a mixture of 207.1 g of phenolic resin B and 125 g of the anhydrous xylene solvent over 30 minutes. The obtained mixture was heated at a temperature of from 140 to 150° C. for 24 hours under reflux until hydrogen chloride stopped bubbling. The hydrogen chloride gas produced was collected by feeding dilute limewater. Then, the xylene solvent was distilled off under a reduced pressure, and the residual reaction mixture was diluted with 400 g of 1,2-dichloroethane. The diluted reaction mixture cooled to about 80° C., and was sufficiently rinsed with 200 g of water, 200 g of a 5% aqueous sodium carbonate solution and 200 g of water. The oil phase was separated. The solvent was distilled off and the oil phase was desiccated, so as to obtain a phosphorus-containing phenolic resin as a viscous liquid. If the viscous liquid cooled, it would solidify.

The obtained phosphorus-containing phenolic resin had a phosphorus content of 1.7%, a softening point of 102° C., a hydroxyl equivalent of 306 g/eq, Mn of 1090, and a hydroxyl group modification ratio of 13%.

Figure 9:
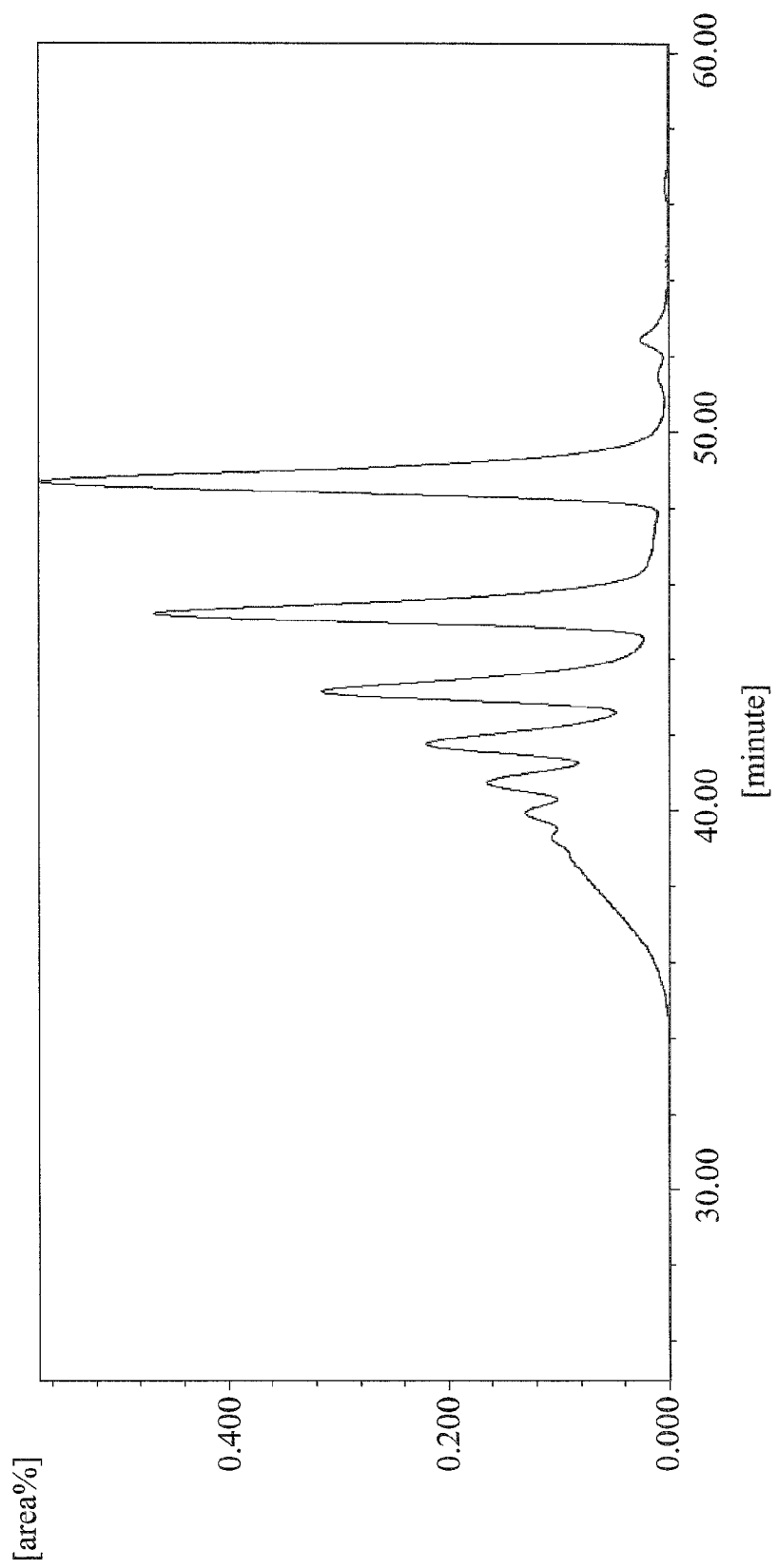
FIG. 9 is a GPC graph of phenolic resin B as a raw material of Example 3.
Figure 10:
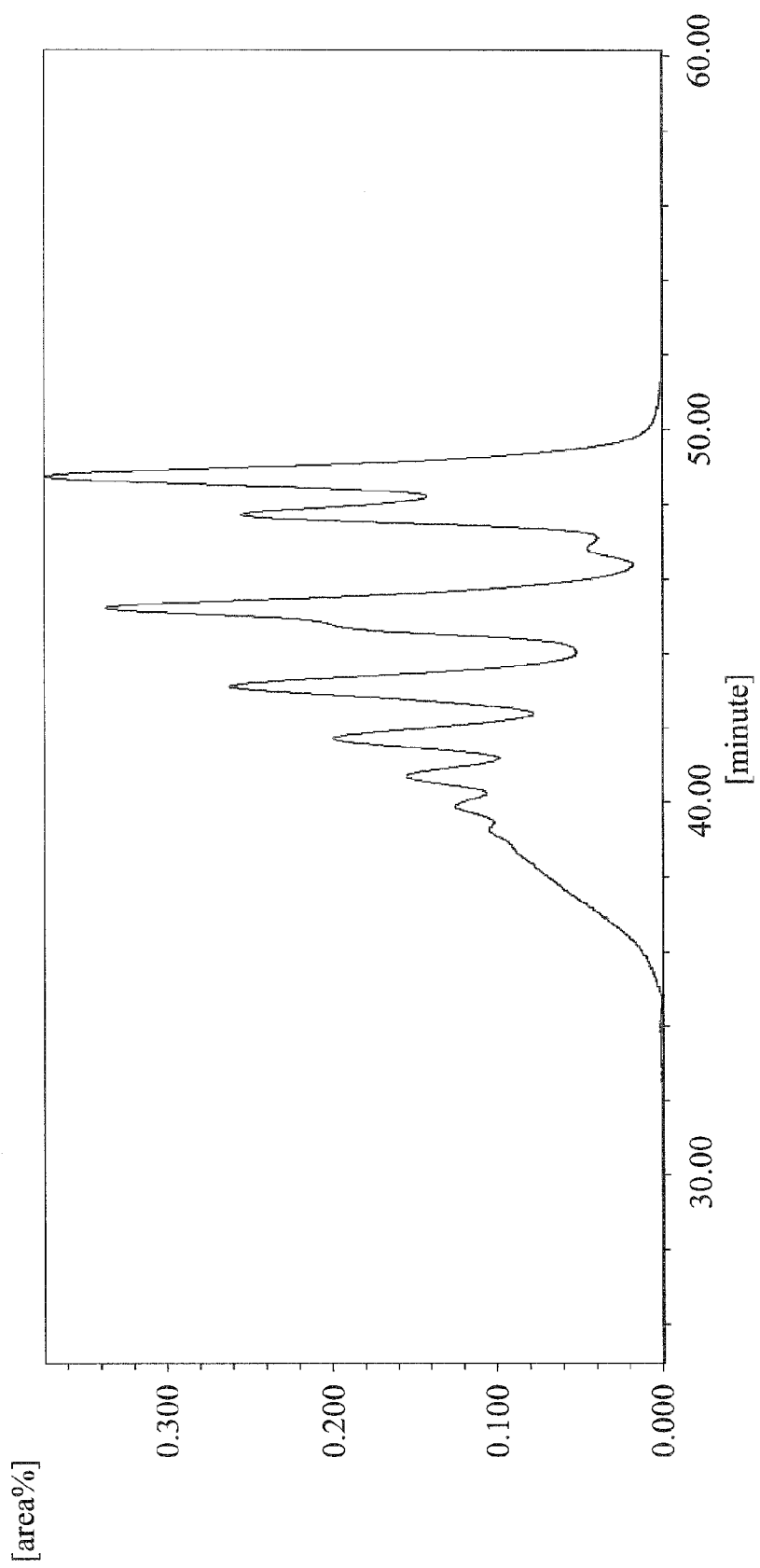
FIG. 10 is a GPC graph of a phosphorus-containing phenolic resin of Example 3.

The GPC graph of phenolic resin B as a raw material is shown in FIG. 9. Moreover, the GPC graph of the obtained phosphorus-containing phenolic resin is shown in FIG. 10.

Comparative Example 1

Synthesis of a Phosphorus-Containing Phenol-Formaldehyde Resin

In a three-necked round-bottom flask equipped with a condenser, a solution made by dissolving 45.1 g of DOPO-C in 100 g of anhydrous xylene as a solvent was added to a mixture of 155.8 g of phenolic resin C and 125 g of the anhydrous xylene solvent over 30 minutes. The obtained mixture was heated at a temperature of from 140 to 150° C. for 24 hours under reflux until hydrogen chloride stopped bubbling. The hydrogen chloride gas produced was collected by feeding dilute limewater. Then, the xylene solvent was distilled off under a reduced pressure, and the residual reaction mixture was diluted with 350 g of 1,2-dichloroethane. The diluted reaction mixture cooled to about 80° C., and was sufficiently rinsed with 200 g of water, 200 g of a 5% aqueous sodium carbonate solution and 200 g of water. The oil phase was separated. The solvent was distilled off and the oil phase was desiccated, so as to obtain a phosphorus-containing phenolic resin as a viscous liquid. If the viscous liquid cooled, it would solidify.

The phosphorus-containing phenolic resin obtained had a phosphorus content of 3.8%, a softening point of 120° C., a hydroxyl equivalent of 177 g/eq, Mn of 760, and a hydroxyl group modification ratio of 14%.

Figure 11:
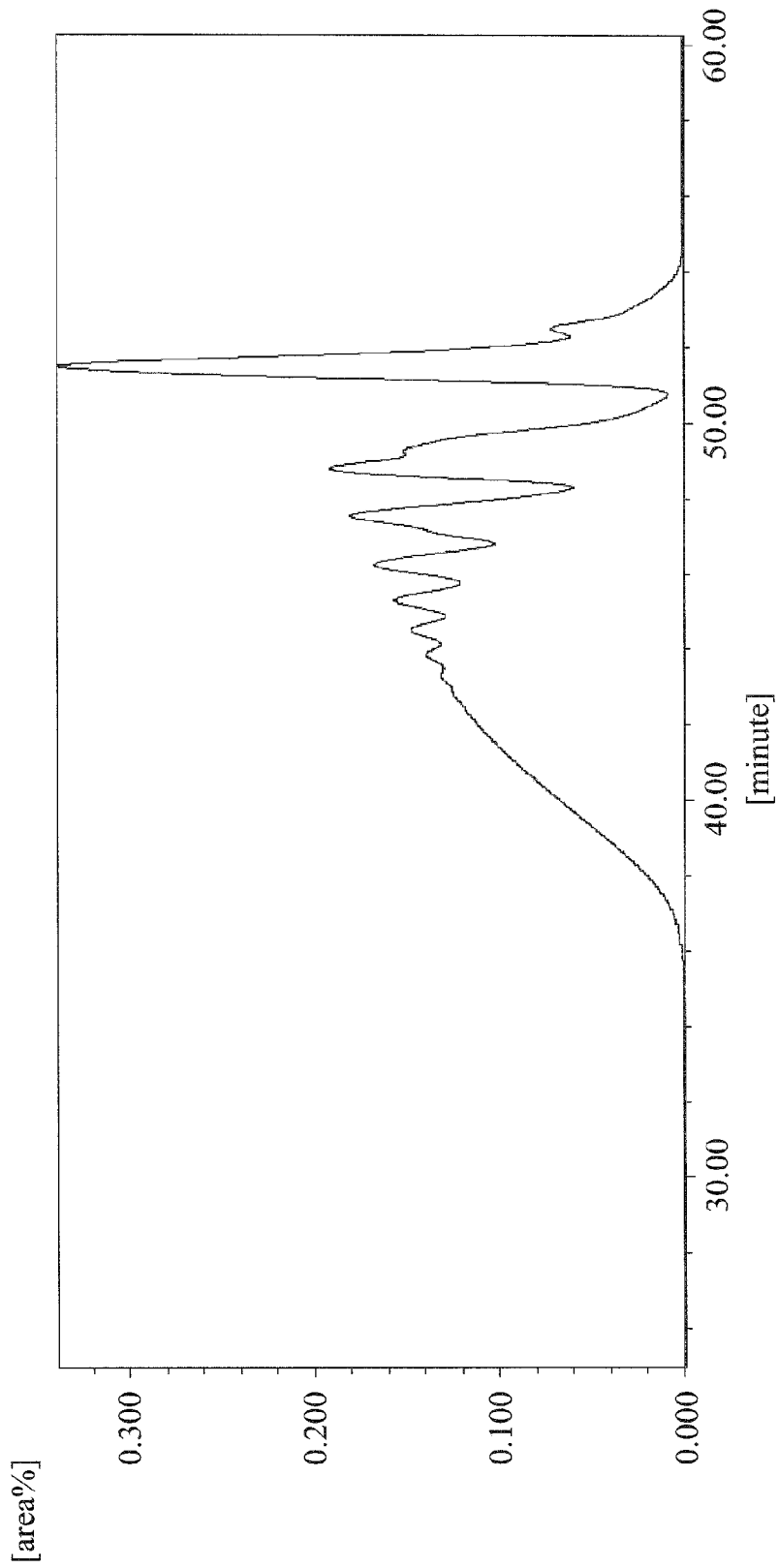
FIG. 11 is a GPC graph of phenolic resin C as a raw material of Comparative Example 1.
Figure 12:
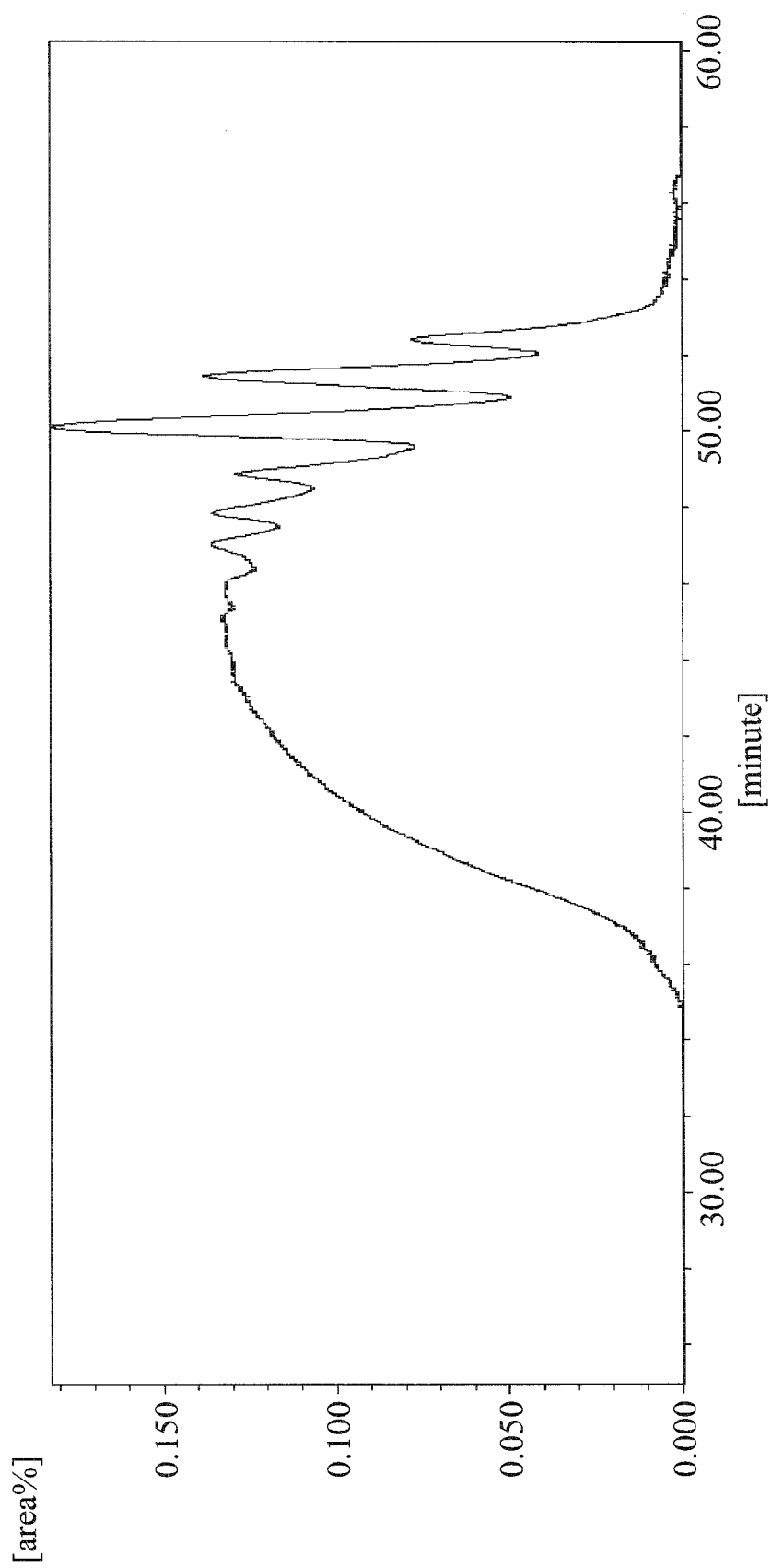
FIG. 12 is a GPC graph of a phosphorus-containing phenolic resin of Comparative Example 1.

The GPC graph of phenolic resin C of the raw material is shown in FIG. 11. Moreover, the GPC graph of the phosphorus-containing phenolic resin obtained is shown in FIG. 12.

The epoxy resin composition including the phosphorus-containing phenolic resin of the present invention is illustrated below.

The examples of the materials used in the epoxy resin composition are first described.

(1) Epoxy Resin
Bisphenol A type epoxy resin 828EL with an epoxy equivalent of 186 g/eq, which was manufactured by Mitsubishi Chemical Company, Ltd.

(2) Epoxy Resin Curing Agents
Phosphorus-free phenolic resin A, phenolic resin B, phenolic resin C, the phosphorus-containing phenolic resins of Examples 1 to 3, and the phosphorus-containing phenolic resin of Comparative Example 1.

(3) Curing Promoter
2-ethyl-4-methylimidazole, 2E4MZ, which was manufactured by Shikoku Chemicals Corporation (4) Phosphorus-Based Flame Retardant
The phosphorus compound represented by formula (6), 9,10-dihydro-9-oxa-10-phosphaphenanthrene-10-oxide (DOPO).

Then, a method for evaluating a cured product obtained from the epoxy resin composition is discussed below.

Water Absorption

The cured product of the epoxy resin was spliced into test materials, each with a size of 30 mm×15 mm×4 mm. The test material was immersed in pure water at 95° C., and the percentage of mass increased, as calculated from the masses before the immersion and 24 hours after the immersion, is the water absorption. Water absorption represents an indicator of moisture tolerance. The smaller the value is, the better the moisture tolerance is.

Permittivity and Dissipation Factor

The cured product of the epoxy resin was spliced into test materials, each with a size of 1.5 mm×1.5 mm×80 mm. ADMSO-10 (1 GHz) manufactured by AET Inc. was used for determination at a frequency of 1 GHz.

Example 4

The phosphorus-containing phenolic resin obtained in Example 1, the epoxy resin and curing promoter were melted and mixed at proportions disclosed in Table 1. The melted mixture was injected into a mold, and heated at 200° C. for 5 hours for curing, so as to obtain a cured product of the epoxy resin with a phosphorus content of 3.3%.

The cured product was spliced into a specific size for evaluation. The evaluation results are shown in Table 1.

Example 5

The operation was conducted in the same manner as that in Example 4, except that the phosphorus-containing phenolic resin of Example 1 was replaced with the phosphorus-containing phenolic resin obtained in Example 2. A cured product of the epoxy resin with a phosphorus content of 1.7% was obtained. Blending and evaluation results of the cured product are shown in Table 1.

Example 6

The operation was conducted in the same manner as that in example 4, except that the phosphorus-containing phenolic resin of Example 1 was replaced with the phenolic resin composition including the phosphorus-containing phenolic resin of Example 2 and phenolic resin A (xylylene type phenolic resin). A cured product of the epoxy resin with a phosphorus content of 1.2% was obtained. Blending and evaluation results of the cured product are shown in Table 1.

Example 7

The operation was conducted in the same manner as that in Example 4, except that the phosphorus-containing phenolic resin of Example 1 was replaced with the phosphorus-containing phenolic resin obtained in Example 3. A cured product of the epoxy resin with a phosphorus content of 1.1% was obtained. Blending and evaluation results of the cured product are shown in Table 1.

Comparative Example 2

The operation was conducted in the same manner as that in Example 4, except that the phosphorus-containing phenolic resin of Example 1 was replaced with a phenolic resin composition including the phosphorus-containing phenolic resin of Comparative Example 1 and phenolic resin C (phenol formaldehyde resin). A cured product of the epoxy resin with a phosphorus content of 1.2% was obtained. Blending and evaluation results of the cured product are shown in Table 1.

Comparative Example 3

The phosphorus-containing resin obtained in Example 1 was replaced with a phosphorus-based flame retardant and a phosphorus-free phenolic resin A (xylylene phenol resin), and then an epoxy resin composition with a phosphorus content of 3.3% was obtained. Although it was desirable to heat the composition to obtain a cured product, the cured product of the epoxy resin composition could not be obtained as a curing reaction did not take place (that is, gelation did not take place).

Comparative Examples 4 to 6

The operations were conducted in the same manner as that in Example 4, except that the phosphorus-containing phenolic resin of Example 1 was replaced with phosphorus-based flame retardants and phosphorus-free phenolic resin A (xylylene type phenolic resin) or phenolic resin B (biphenyl type phenolic resin). Cured products of the epoxy resins with phosphorus contents of from 1.1 to 1.7% were obtained. Blending and evaluation results of the cured products are shown in Table 1.

Comparative Examples 7 and 8

The operations were conducted in the same manner as that in Example 4, except that the phosphorus-containing phenolic resin of Example 1 was replaced with phosphorus-free phenolic resin A (xylylene type phenolic resin) or phenolic resin B (biphenyl type phenolic resin) (i.e., free of a phosphorus-based flame retardant). Cured products of the phosphorus-free epoxy resins were obtained. Blending and evaluation results of the cured products are shown in Table 1.

TABLE 1

Summary of blending and evaluation results

| | | unit | Example 4 | Example 5 | Example 6 | Example 7 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| Blending of the epoxy resin composition | Epoxy resin 828EL | mass part | 100 | 100 | 100 | 100 | 100 | 100 | 100 | 100 | 100 | 100 | 100 |
| | Phosphorus-containing phenolic resin of Example 1 | mass part | 236 | | | | | | | | | | |
| | Phosphorus-containing phenolic resin of Example 2 | mass part | | 151 | 96 | | | | | | | | |
| | Phosphorus-containing phenolic resin of Example 3 | mass part | | | | 165 | | | | | | | |
| | Phosphorus-containing phenolic resin of Comparative Example 1 | mass part | | | | | | 57 | | | | | |
| | Phenolic resin A (xylylene type phenolic resin) | mass part | | | 36 | | | | 96 | 96 | 96 | 96 | |
| | Phenolic resin B (biphenyl type phenolic resin) | mass part | | | | | | | | | | 125 | 125 |
| | Phenolic resin C (phenolic formaldehyde resin) | mass part | | | | | 23 | | | | | | |
| | Curing promoter 2E4MZ | mass part | 0.40 | 0.40 | 0.29 | 1.00 | 0.12 | 0.40 | 0.40 | 0.30 | 0.50 | 0.10 | 0.20 |
| | Phosphorus-based flame retardant DOPO | mass part | | | | | | | 58 | 27 | 18 | 18 | |
| | Phosphorus content of phenolic resin composition | mass % | 4.7 | 2.9 | 2.1 | 1.7 | 2.7 | | | | | | |
| Evaluation of the cured product | Phosphorus content of cured product | mass % | 3.3 | 1.7 | 1.2 | 1.1 | 1.2 | 3.3 | 1.7 | 1.2 | 1.1 | 0.0 | 0.0 |
| | Water absorption | mass % | 0.7 | 0.9 | 0.9 | 0.9 | 1.3 | Not cured | 1.2 | 1.2 | 1.0 | 0.9 | 0.9 |
| | Permittivity | — | — | 3.15 | 3.17 | 3.17 | 3.27 | | 3.22 | 3.22 | 3.21 | 3.25 | 3.23 |
| | Dissipation factor | — | — | 0.016 | 0.019 | 0.017 | 0.025 | | 0.022 | 0.021 | 0.020 | 0.027 | 0.024 |

As seen from Table 1, the use of the epoxy resin composition including a phosphorus-containing phenolic resin of the present invention brought about low values of water absorption, permittivity and dissipation factor, excellent moisture tolerance and dielectric property. In particular, as compared with the use of the phosphorus-free phenolic resins of Comparative Examples 7 and 8, the moisture tolerance brought about by the epoxy resin composition of the present invention was not reduce, and the dielectric property was improved.

On the other hand, it is known that Comparative Example 2 (where the phosphorus-containing phenolic resin obtained according to patent document 1 was used) and Comparative Examples 3 to 5 (wherein the phosphorus-based flame retardants were used) showed high values of water absorption, permittivity and dissipation factor, and also had problems regarding moisture tolerance and dielectric property.

The followings illustrate a pre-immersion body of the epoxy resin composition of the present invention and a copper-clad laminated plate by using the pre-immersion bodies.

The materials used were first illustrated below.

(1) Epoxy Resin

Bisphenol A type epoxy resin 828EL with an epoxy equivalent of 186 g/eq, which was manufactured by Mitsubishi Chemical Corporation.

(2) Epoxy Resin Curing Agent

Phosphorus-free phenolic resin A, phenolic resin B, phenolic resin C, the phosphorus-containing phenolic resins of Examples 1 to 3, and the phosphorus-containing phenolic resin of Comparative Example 1.

(3) Curing Promoter 2-ethyl-4-methylimidazole, 2E4MZ, which was manufactured by Shikoku Chemicals Corporation (4) Solvent Methyl ethyl ketone (MEK), which was manufactured by Wako Pure Chemical Industries, Ltd.

(5) Glass Fabric

Alkali-free treated glass fabric, M7628-105, which was manufactured by Arisawa Manufacturing Co., Ltd.

(6) Copper Foil

Electrolytic copper foil CF-T9B-THE, which was manufactured by Fukuda Metal Foil & Powder Co., Ltd.

Then, the followings illustrate the methods for evaluating the laminated plates.

Flammability Test

The copper-unclad laminated plates were subjected to a vertical flammability test according to UL-94 standard.

Peeling Test

Laminated plates having copper foil bands each with a width of 10 mm, as formed by subjecting to an etching treatment, were used as test pieces. Autograph ("AG-5000D," manufactured by Shimadzu Corporation) was used. The peeling strength of the copper foils at 90° was determined at a testing speed of 50 mm/minute.

Example 8

The phosphorus-containing phenolic resin obtained in Example 1, an epoxy resin, a curing promoter, and methyl ethyl acetone as a solvent were blended at proportions described in Table 2, and the varnish of an epoxy resin composition including a resin component with a phosphorus content of 3.3% was formulated. After the glass fabric was immersed in the varnish, it was desiccated at 130° C. for 15 minutes, and thereby obtaining a pre-immersion body. The pre-immersion body was spliced into sheets, each with a size of 150 mm×95 mm, 8 pieces of the sheets were stacked, held by copper foil, pressed in a thermal presser that was already heated to 170° C., and subjected to a heat treatment at 200° C. for 5 hours, and thereby obtaining a copper-clad laminated plate.

The unwanted portion of the copper foil on the surface of the copper-clad laminated plate was removed by an etching solution and after rinsing, the laminated plate was evaluated. The evaluation results are shown in Table 2.

Example 9

The phosphorus-containing phenolic resin obtained in Example 2 was used to replace the phosphorus-containing phenolic resin obtained in Example 1, and adjusted to obtain a varnish including a resin component with a phosphorus content of 1.7%. The operation was conducted in the same manner as that in Example 8, except that a different varnish was used. Blending of the epoxy resin composition and the evaluation results of the laminated plate are shown in Table 2.

Example 10

The phosphorus-containing phenolic resin obtained in Example 3 was used to replace the phosphorus-containing phenolic resin obtained in Example 1, and adjusted to obtain a varnish including a resin component with a phosphorus content of 1.1%. The operation was conducted in the same manner as that in Example 8, except that a different varnish was used. Blending of the epoxy resin composition and the evaluation results of the laminated plate are shown in Table 2.

Comparative Example 9

A phosphorus-based flame retardant and phenolic resin A (xylylene type phenolic resin) were used to replace the phosphorus-containing phenolic resin obtained in Example 1 and thus a varnish including a resin component with a phosphorus content of 1.7% was manufactured. The operation was conducted in the same manner as that in Example 8 to obtain a copper-clad laminated plate, except that a different varnish was used, and the desiccating condition for the pre-immersion body was 150° C. for 5 minutes. Blending of the epoxy resin composition and the evaluation results of the laminated plate are shown in Table 2.

Comparative Example 10

A phosphorus-based flame retardant and phenolic resin B (biphenyl type phenolic resin) were used to replace the phosphorus-containing phenolic resin obtained in Example 1, and thus a varnish including a resin component with a phosphorus content of 1.1% was manufactured. The operation was conducted in the same manner as that in Example 8 to obtain a copper-clad laminated plate, except that a different varnish was used, and the desiccating condition for the pre-immersion body was 150° C. for 5 minutes. Blending of the epoxy resin composition and the evaluation results of the laminated plate are shown in Table 2.

Comparative Examples 11 to 12

Phenolic A or phenolic B was used to replace the phosphorus-containing phenolic resin obtained in Example 1, and thus phosphorus-free vanishes were prepared. The operations were conducted in the same manner as that in Example 8, except that different varnishes were used. Blending of the epoxy resin compositions and the evaluation results of the laminates are shown in Table 2.

TABLE 2

Summary of blending and evaluation results of laminated plates

|  |  | Unit | Example 8 | Example 9 | Example 10 | Comparative Example 9 | Comparative Example 10 | Comparative Example 11 | Comparative Example 12 |
|---|---|---|---|---|---|---|---|---|---|
| blending of epoxy resin composition | epoxy resin 828EL | mass part | 100 | 100 | 100 | 100 | 100 | 100 | 100 |
|  | Phosphorus-containing phenolic resin of Example 1 | mass part | 236 |  |  |  |  |  |  |
|  | Phosphorus-containing phenolic resin of Example 2 | mass part |  | 151 |  |  |  |  |  |
|  | phosphorus-containing phenolic resin of Example 3 | mass part |  |  | 165 |  |  |  |  |
|  | phosphorus-containing phenolic resin of Comparative Example 1 | mass part |  |  |  |  |  |  |  |
|  | Phenolic resin A (xylylene type phenolic resin) | mass part |  |  |  | 96 |  | 96 |  |
|  | Phenolic resin B (biphenyl type phenolic resin | mass part |  |  |  |  | 125 |  | 125 |
|  | Phenolic resin C (phenol formaldehyde resin) | mass part |  |  |  |  |  |  |  |
|  | Curing promoter 2E4MZ | mass part | 0.40 | 0.40 | 1.00 | 0.40 | 0.50 | 0.10 | 0.20 |
|  | Phosphorus-based flame retardant DOPO | mass part |  |  |  | 27 | 18 |  |  |
|  | Solvent Methylethyl ketone | mass part | 144 | 108 | 114 | 84 | 97 | 84 | 96 |
|  | Phosphorus content of phenolic resin composition (a total of the phenolic resin and phosphorus-containing phenolic resin) | mass % | 4.7 | 2.9 | 1.7 |  |  |  |  |
| Evaluation of the laminates | Phosphorus content of resin component (a total of the phosphorus-containing phenolic resin, phenolic resin and epoxy resin) | mass % | 3.3 | 1.7 | 1.1 | 1.7 | 1.1 | 0.0 | 0.0 |
|  | Peeling strength | N/mm | 0.2 | 1.2 | 1.5 | 0.2 | 0.4 | 1.7 | 2.0 |
|  | Flammability test (ULtest) Total burning time | Second | 44 | 44 | 49 | 40 | 102 | 250< | 250< |
|  | Determination | – | V-0 | V-0 | V-0 | V-0 | V-1 | Fully burned | Fully burned |

As seen from Table 2, the uses of the copper-clad laminated plates containing the epoxy resin compositions each including a phosphorus-containing phenolic resin of the present invention could achieve flame retardation classified as V-0 in a flammability test. Especially, Example 10, where the resin component with a phosphorus content of 1.1%, could also achieve flame retardation classified as V-0 in a flammability test.

On the other hand, as compared with Comparative Examples 11 and 12 which did not contain phosphorus, Comparative Examples 9 and 10 where the phosphorus-based flame retardants were used showed improved flame retardation. However, as compared with Example 10 where flame retardation was classified as V-0, Comparative Example 10, which showed the same phosphorus content, did not achieve flame retardation classified as V-0. Moreover, as known from the comparison of Example 9 and Comparative Example 9 and the comparison of Example 10 and Comparative Example 10, the present invention showed excellent adhesion as indicated by the peeling strength, even when the phosphorus contents of the examples and the comparative examples were the same.

INDUSTRIAL APPLICABILITY

According to the present invention, a novel phosphorus-containing phenolic resin and an epoxy resin composition including the phosphorus-containing phenolic resin are provided. When the phosphorus-containing phenolic resin is used as an epoxy resin curing agent, the cured product of the phosphorus-containing phenolic resin not only has excellent flame retardation, but also has various excellent properties such as low water absorption, low permittivity, a low dissipation factor and excellent adhesion. According to the present invention, in an electronic element such as a printed wiring board, sufficient flame retardation can also be achieved without the use of a combination of a halogen-based flame retardant and an antimony compound. Moreover, the phosphorus-containing phenolic resin of the present invention has excellent moisture tolerance and adequate adhesion, such that it is also suitable for use in the fabrication of a printed wiring board by applying a step of lead-free reflow soldering. Furthermore, since the phosphorus-containing phenolic resin of the present invention has low permittivity and a low dissipation factor, it is also suitable for use in a printed wiring board for high-frequency telecommunication.

What is claimed is:

1. A phosphorus-containing phenolic resin represented by formula (1):

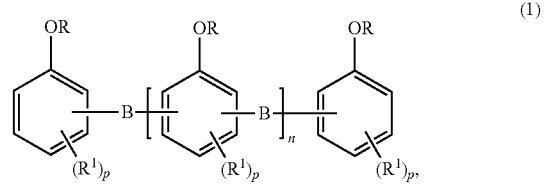

wherein:
each R is independently a hydrogen atom or a phosphorus-containing group represented by formula (2),

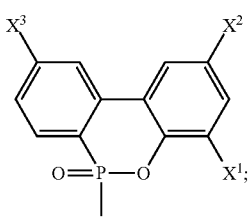
(2)

at least one R is the phosphorus-containing group represented by formula (2);
$X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group or a sulfonate group;
each $R^1$ is independently an alkyl group having a carbon number of from 1 to 10;
each p is independently an integer of from 0 to 3;
each B is independently a divalent group represented by formula (3-1) or (3-2);

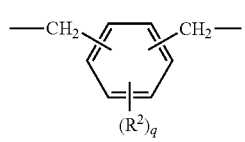
(3-1)

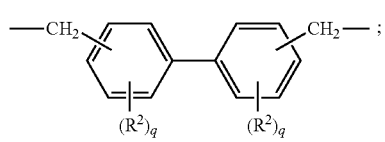
(3-2)

each $R^2$ is independently an alkyl group having a carbon number of from 1 to 10;
each q is independently an integer of from 0 to 4; and
n is an average and is a number of from 0 to 100.

2. The phosphorus-containing phenolic resin of claim 1, wherein $X^1$, $X^2$ and $X^3$ are hydrogen atoms.

3. The phosphorus-containing phenolic resin of claim 1, which has a phosphorus content of from 0.1 to 9 mass %.

4. A phosphorus-containing phenolic resin obtained by reacting a phenolic resin represented by formula (1'),

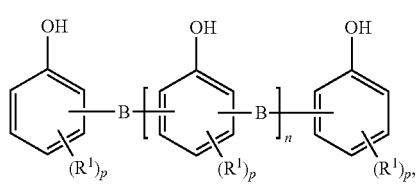
(1')

and
a phosphorus compound represented by formula (2'),

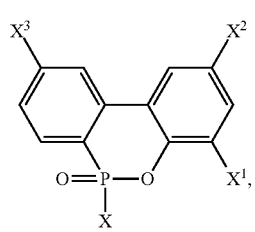
(2')

wherein:
each $R^1$ is independently an alkyl group having a carbon number of from 1 to 10;
each p is independently an integer of from 0 to 3;
each B is independently a divalent group represented by formula (3-1) or (3-2);

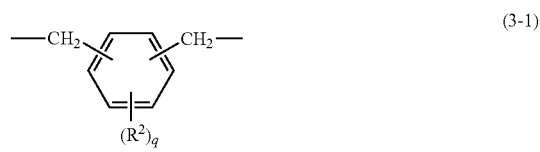
(3-1)

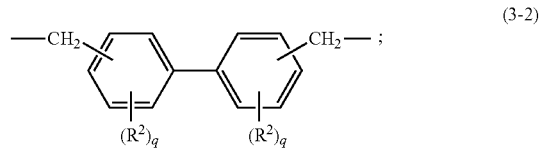
(3-2)

each $R^2$ is independently an alkyl group having a carbon number of from 1 to 10;
each q is independently an integer of from 0 to 4;
n is an average and is a number of from 0 to 100;
X is a halogen atom; and
$X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group or a sulfonate group.

5. The phosphorus-containing phenolic resin of claim 4, wherein $X^1$, $X^2$ and $X^3$ are hydrogen atoms.

6. The phosphorus-containing phenolic resin of claim 4, wherein an amount of from 0.01 to 1.5 mole of the phosphorus compound represented by formula (2') is provided in the reaction, relative to 1 mole of a phenolic hydroxyl group in formula (1').

7. A phenolic resin composition, comprising the phosphorus-containing phenolic resin of claim 1.

8. The phenolic resin composition of claim 7, which has a phosphorus content of from 0.1 to 9 mass %.

9. An epoxy resin curing agent, comprising the phenolic resin composition of claim 7.

10. An epoxy resin composition, comprising the epoxy resin curing agent of claim 9 and an epoxy resin.

11. A cured product obtained by curing the epoxy resin composition of claim 10.

12. A copper-clad laminated plate formed by using the epoxy resin composition of claim 10 as a matrix resin.

13. A method for manufacturing a phosphorus-containing phenolic resin, comprising:
reacting a phenolic resin represented by formula (1'),

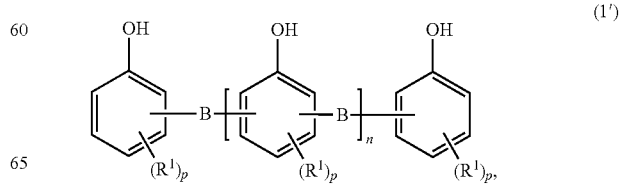
(1')

and
a phosphorus compound represented by formula (2'),

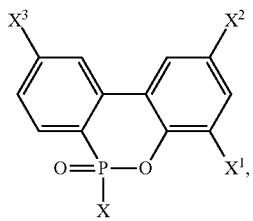
(2')

wherein:
each $R^1$ is independently an alkyl group having a carbon number of from 1 to 10;
each p is independently an integer of from 0 to 3;
each B is independently a divalent group represented by formula (3-1) or (3-2);

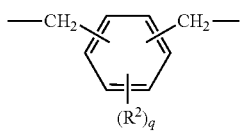
(3-1)

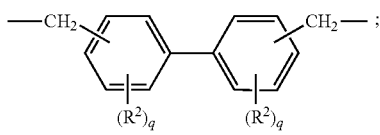
(3-2)

each $R^2$ is independently an alkyl group having a carbon number of from 1 to 10;
each q is independently an integer of from 0 to 4;
n is an average and is a number of from 0 to 100;
X is a halogen atom; and
$X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group or a sulfonate group.

14. The method of claim 13, wherein $X^1$, $X^2$ and $X^3$ are hydrogen atoms.

15. The method of claim 13, further comprising:
oxidizing a compound represented by formula (6),

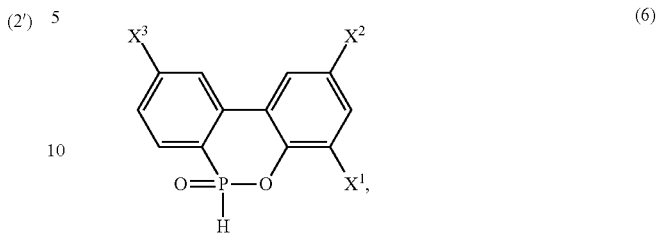
(6)

to obtain a compound represented by formula (7),

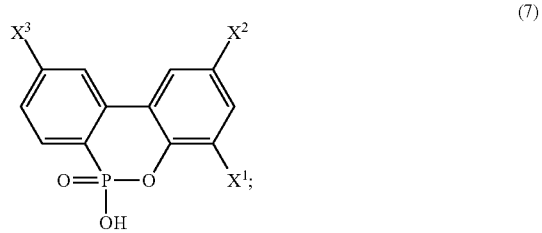
(7)

and
halogenating the compound represented by formula (7) to obtain the phosphorus compound represented by formula (2'),
wherein $X^1$, $X^2$ and $X^3$ are each independently a hydrogen atom, a halogen atom, an alkyl group having a carbon number of from 1 to 8, a cycloalkyl group having a carbon number of from 3 to 10, an allyl group, an aryl group, an aralkyl group, a hydroxyl group, an alkoxy group having a carbon number of from 1 to 8, a cyano group, a sulfo group or a sulfonate group.

16. A phenolic resin composition, comprising the phosphorus-containing phenolic resin of claim 4.

17. The phenolic resin composition of claim 16, which has a phosphorus content of from 0.1 to 9 mass %.

18. An epoxy resin curing agent, comprising the phenolic resin composition of claim 16.

19. An epoxy resin composition, comprising the epoxy resin curing agent of claim 18 and an epoxy resin.

20. A cured product obtained by curing the epoxy resin composition of claim 19.

21. A copper-clad laminated plate formed by using the epoxy resin composition of claim 19 as a matrix resin.

* * * * *